(12) United States Patent
Park et al.

(10) Patent No.: US 10,761,650 B2
(45) Date of Patent: Sep. 1, 2020

(54) TOUCH SENSING DEVICE FOR DETERMINING INFORMATION RELATED TO PEN, CONTROL METHOD THEREFOR, AND PEN

(71) Applicant: Samsung Electronics Co., Ltd., Suwon-si, Gyeonggi-do (KR)

(72) Inventors: Sung-Soo Park, Suwon-si (KR); Byung-Hoon Kang, Suwon-si (KR); Chang-Byung Park, Suwon-si (KR); Kang-Nam Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/322,010

(22) PCT Filed: Aug. 3, 2017

(86) PCT No.: PCT/KR2017/008382
§ 371 (c)(1),
(2) Date: Jan. 30, 2019

(87) PCT Pub. No.: WO2018/026202
PCT Pub. Date: Feb. 8, 2018

(65) Prior Publication Data
US 2019/0163320 A1 May 30, 2019

(30) Foreign Application Priority Data

Aug. 4, 2016 (KR) .................. 10-2016-0099700

(51) Int. Cl.
*G06F 3/041* (2006.01)
*G06F 3/044* (2006.01)
(Continued)

(52) U.S. Cl.
CPC .......... *G06F 3/0416* (2013.01); *G06F 3/0383* (2013.01); *G06F 3/03545* (2013.01);
(Continued)

(58) Field of Classification Search
CPC .. G06F 3/0416; G06F 3/0442; G06F 3/04162; G06F 3/0418; G06F 3/03545; G06F 3/0383; G06F 3/044
See application file for complete search history.

(56) References Cited

U.S. PATENT DOCUMENTS

2011/0193776 A1 8/2011 Oda et al.
2012/0327042 A1* 12/2012 Harley ................ G06F 3/03545
345/179
(Continued)

FOREIGN PATENT DOCUMENTS

KR 10-2013-0026995 A 3/2013
KR 10-2016-0016065 A 2/2016

*Primary Examiner* — Premal R Patel
(74) *Attorney, Agent, or Firm* — Jefferson IP Law, LLP

(57) ABSTRACT

A touch sensing device determines a contact location of a pen by using a first electrode signal generated from a first electrode of the pen, determines additional information related to the pen by using a second electrode signal generated from a second electrode of the pen, and can determine tilt information of the pen and/or rotation information of the pen by using a profile of the first electrode signal and a profile of the second electrode signal.

12 Claims, 38 Drawing Sheets

(51) Int. Cl.
*G06F 3/0354* (2013.01)
*G06F 3/038* (2013.01)

(52) U.S. Cl.
CPC ............ *G06F 3/044* (2013.01); *G06F 3/0418* (2013.01); *G06F 3/0442* (2019.05); *G06F 3/04162* (2019.05)

(56) References Cited

U.S. PATENT DOCUMENTS

| | | |
|---|---|---|
| 2013/0057491 A1 | 3/2013 | Chu et al. |
| 2015/0070316 A1* | 3/2015 | Oda ...................... G06F 3/0383 345/174 |
| 2015/0145836 A1 | 5/2015 | Katsurahira |
| 2015/0153845 A1* | 6/2015 | Chang ................. G06F 3/03545 345/179 |
| 2015/0378453 A1 | 12/2015 | Wu et al. |
| 2016/0209957 A1 | 7/2016 | Jung et al. |
| 2017/0068337 A1* | 3/2017 | Bhandari ............ G06F 3/03545 |
| 2017/0249028 A1* | 8/2017 | Marshall ............. G06F 3/03545 |
| 2017/0262122 A1* | 9/2017 | Chang ..................... G06F 3/044 |
| 2017/0344174 A1* | 11/2017 | Pant ..................... G06F 3/0416 |

\* cited by examiner

TOUCH SENSING DEVICE FOR DETERMINING INFORMATION RELATED TO PEN, CONTROL METHOD THEREFOR, AND PEN

CROSS-REFERENCE TO RELATED APPLICATION(S)

This application is a U.S. National Stage application under 35 U.S.C. § 371 of an International application number PCT/KR2017/008382, filed on Aug. 3, 2017 and which is based on and claimed priority of a Korean patent application number 10-2016-0099700, filed on Aug. 4, 2016, in the Korean Intellectual Property Office the disclosure of which is incorporated by reference herein in its entirety.

TECHNICAL FIELD

The present disclosure relates to a touch sensing device that determines information related to a pen, a control method of the touch sensing device, and the pen, and more particularly, to a touch sensing device that determines various pen-related information including the position of a pen, additional information from the pen, tilt information of the pen, rotation information of the pen, and so forth, a control method of the touch sensing device and the pen.

BACKGROUND ART

Recently, smart phones or tablet personal computers (PCs) have become widely spread, and techniques for contact position measurement devices included therein have been actively developed. A smart phone or tablet PC usually includes a touch screen, and a user may designate specific coordinates on the touch screen by using a finger or a pen. The user may input a particular signal to the smart phone by designating particular coordinates on the touch screen.

The touch screen may operate based on an electric scheme, an infrared scheme, and an ultrasonic scheme, and an example of the electric scheme may include a resistive (R)-type touch screen or a capacitive (C)-type touch screen. Conventionally, R-type touch screens are mostly used, and is capable of simultaneously recognizing a user's finger and a pen, but the R-type touch screen has a problem that a reflection is caused by an air layer between indium tin oxide (ITO) layers. More specifically, due to the air layer between the ITO layers, transmittance of light transmitting from a display is degraded, increasing external light reflection.

Thus, nowadays, C-type touch screens have been popularly used. C-type touch screens operate in a way such that they sense a change in a capacitance of a transparent electrode occurring due to the contact of an object. However, C-type touch screens have an operation error resulting from unintended contact of a hand using a pen because the hand and the pen are difficult to physically distinguish from each other.

Conventional techniques for solving this problem may include processing with software that distinguishes a hand from a pen based on a contact area, using a separate location measurement device such as an electromagnetic resonance (EMR) type in addition to the C-type touch screen, and so forth. The techniques may also include an electrically coupled resonance (ECR) type to receive an electric field from the pen in an electrode and measure the location of the pen.

Unlike a passive pen technique like an EMR pen or an ECR pen, an active pen technique uses an included power source.

DETAILED DESCRIPTION OF THE INVENTION

Technical Problem

A conventional touch sensing device has implemented a method for measuring the location of a pen by using various signals from the pen. For example, the strength of a signal from the pen may be measured differently for each channel, and a conventional touch sensing device measures the location of the pen based on the strength of a signal measured for each channel Meanwhile, with the touch sensing device, a function such as obtaining additional information such as the contact pressure of the pen, the pressed state of a button, or identification information of the pen, and so forth other than location information of the pen, measuring the degree of tilt of the pen, or measuring the degree of rotation of the pen may provide convenience to users.

Various embodiments of the present disclosure provide a touch sensing device capable of measuring the degree of tilt of the pen or the degree of rotation of the pen, and a control method of the touch sensing device.

Technical Solution

A touch sensing device, according to various embodiments of the present disclosure, includes a plurality of first axis electrodes arranged in a first direction, a plurality of second axis electrodes arranged in a second direction that intersects the plurality of first axis electrodes, and a controller, in which the controller is configured to, upon receiving a first electrode signal generated from a first electrode of a pen through the plurality of first axis electrodes and the plurality of second axis electrodes, determine the contact position of the pen by using the first electrode signal, to, upon receiving a second electrode signal generated from a second electrode of the pen through the plurality of first axis electrodes and the plurality of second axis electrodes, determine additional information related to the pen by using the second electrode signal, and to determine at least one of tilt information of the pen and rotation information of the pen by using a profile of the first electrode signal and a profile of the second electrode signal.

A touch sensing device, according to various embodiments of the present disclosure, includes a plurality of first axis electrodes arranged in a first direction, a plurality of second axis electrodes arranged in a second direction that intersects the plurality of first axis electrodes, and a controller, in which the controller is configured to, upon receiving a first electrode signal generated from a first electrode of a pen through the plurality of first axis electrodes and the plurality of second axis electrodes, determine the contact position of the pen by using the first electrode signal, to, upon receiving a second electrode signal generated from a second electrode of the pen through the plurality of first axis electrodes and the plurality of second axis electrodes, determine additional information related to the pen by using the second electrode signal, and to determine at least one of the tilt direction of the pen and the tilt degree of the pen based on the asymmetry of a profile of the second electrode signal.

A touch sensing device, according to various embodiments of the present disclosure, includes a plurality of first axis electrodes arranged in a first direction, a plurality of second axis electrodes arranged in a second direction that intersects the plurality of first axis electrodes, and a controller, in which the controller is configured to, upon receiving signals respectively generated from a first sub-electrode and a second sub-electrode of a pen through the plurality of first axis electrodes and the plurality of second axis electrodes during a first drive period, determine at least one of the tilt direction of the pen and the tilt degree of the pen by using a profile of the signal, and to determine rotation information of the pen by comparing a profile of an electrode signal generated from the second sub-electrode during a second drive period with a profile sensed during the first drive period.

A pen, according to various embodiments of the present disclosure, includes a first electrode, a second electrode arranged physically apart from the first electrode, and a controller, in which the controller is configured to control the first electrode to generate a first electrode signal having a first frequency, when the contact pressure between the tip of the pen and the touch sensing device is less than a threshold value, and to control the second electrode to generate a second electrode signal having a second frequency that is different from the first frequency while controlling the first electrode to generate the first electrode signal, when the contact pressure is greater than or equal to the threshold value.

Advantageous Effects

According to various embodiments of the present disclosure, a touch sensing device capable of measuring the degree of tilt of the pen or the degree of rotation of the pen, and a control method of the touch sensing device may be provided. Various effects of the pen may be output based on the degree of tilt of the pen or the degree of rotation of the pen, thereby guaranteeing diversity of a user interface.

MODE FOR CARRYING OUT THE INVENTION

Figure 1A:
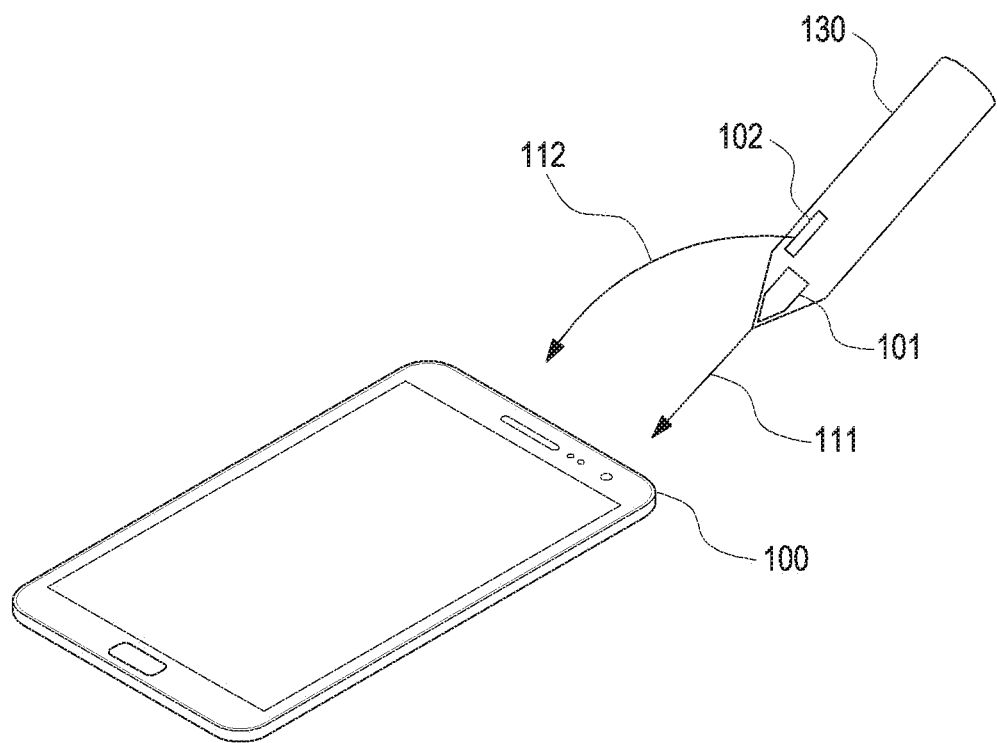
FIG. 1A is a conceptual view of a pen and a touch sensing device according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

A touch sensing device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the touch sensing device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

In other embodiments, the touch sensing device may include at least one of various medical equipment (for example, magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the touch sensing device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the touch sensing device may be flexible or may be a combination of two or more of the above-described various devices. According to an embodiment of the disclosure, the touch sensing devices are not limited to those described above. Herein, the term "user" used in various embodiments of the present disclosure may refer to a person who uses the touch sensing device or a device using the touch sensing device (e.g., an artificial intelligence touch sensing device).

FIG. 1A is a conceptual view of a pen and a touch sensing device according to various embodiments of the present disclosure. A touch sensing device 100 is disclosed in the form of, for example, a tablet, but the type thereof is not limited as long as the touch sensing device 100 is an electronic device for measuring the location of a pen 130. The pen 130, according to various embodiments of the present disclosure, may include two different electrodes 101 and 102. The first electrode 101 may generate a first electrode signal 111, and the second electrode 102 may generate a second electrode signal 112. Herein, the first electrode signal 111 may be set for use in measurement of the location of the pen 130 by the touch sensing device 100. The second electrode signal 112 may be set for use in the measurement of the additional information from the pen 130 by the touch sensing device 100. The additional information may include various types of additional information such as the magnitude of the contact pressure between the tip and the contact surface of the pen 130, information indicating whether the contact pressure is greater than or equal to a threshold value, information indicating whether a button of the pen 130 is pressed, identification information of the pen 130, and so forth.

The touch sensing device 100 may determine the location of the pen 130 by using the first electrode signal 111. The touch sensing device 100 may determine, by using the second electrode signal 112, the additional information from the pen 130, for example, the magnitude of the contact pressure detected at the tip of the pen 130, the information indicating whether the contact pressure is greater than or equal to the threshold value, the information indicating whether the button of the pen 130 is pushed, the identification information of the pen 130, and so forth. The touch sensing device 100 may compare the first electrode signal 111 with the second electrode signal 112 and determine tilt information of the pen 130 by using the result of the comparison. The touch sensing device 100 may determine rotation information of the pen 130 by using the result of the comparison between the first electrode signal 111 and the second electrode signal 112. The touch sensing device 100 may determine at least one of the rotation information and the tilt information of the pen 130 by comparing a profile of the first electrode signal 111 with a profile of the second electrode signal 112. By means of a signal from an electrode of the pen 130, an electric signal may be output from each electrode. For example, an electric signal of a relatively high strength may be output from an electrode arranged relatively close to the pen 130, and an electric signal of a relatively low strength may be output from an electrode arranged relatively far from the pen 130. The touch sensing device 100 may include a grid where a plurality of electrodes intersect. The strength of the electric signal corresponding to each electrode in the grid may depend on the distance from the pen 130. In various embodiments of the present disclosure, a profile of a signal may mean the distribution of the strength of a signal received in each electrode in the grid. That is, the profile may mean the distribution of the magnitude of an electrode signal generated from an object, which is sensed by the touch sensing device.

In various embodiments of the present disclosure, the touch sensing device 100 may determine at least one of the rotation information and the tilt information of the pen 130 by using a type of the profile of the first electrode signal 111, a type of the profile of the second electrode signal 112, a relative location, and so forth. The touch sensing device 100 may differently display the thickness of a line made in handwriting according to the degree of tilt of the pen 130. For example, for handwriting using a real brush, different handwriting may be performed according to the direction in which the brush is tilted, the degree at which the brush is tilted, and the angle at which the brush is rotated. The touch sensing device 100 according to the present disclosure may provide a handwriting function that is similar to handwriting based on a real brush by determining a handwriting effect according to at least one of the tilt direction of the brush, the tilt degree of the brush, and the rotation angle of the brush. The touch sensing device 100 may receive a signature from the user. In this case, handwriting habits may differ from user to user, and the touch sensing device 100 may determine a handwriting habit for each user by using at least one of the tilt direction, the tilt degree, and the rotation angle. The handwriting habit unique to the user may be used as authentication information for authenticating the user.

Figure 1B:
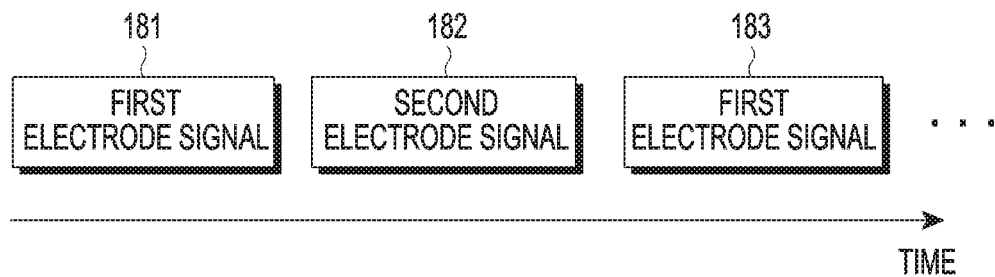
FIGS. 1B and 1C are conceptual views for describing the time when a first electrode signal is generated and the time when a second electrode signal is generated in a pen according to various embodiments of the present disclosure.

FIG. 1B is a conceptual view for describing the time when a first electrode signal is generated and the time when a second electrode signal is generated in the pen 130 according to various embodiments of the present disclosure. The pen 130 may send a first electrode signal 181 during a first period and send a second electrode signal 182 during a second period after the first period. The pen 130 may stop transmitting the first electrode signal 181 during the second period. Moreover, the pen 130 may resume transmitting a first electrode signal 183 during a third period after the second period, and thereafter, may stop transmitting the first electrode signal 183 and transmitting the second electrode signal 182, although not shown. Thus, the pen 130 may alternately perform transmission of the first electrode signal and transmission of the second electrode signal. In this case, the first electrode signal and the second electrode signal may have the same frequency or different frequencies. The touch sensing device 100 may distinguish the first electrode signal and the second electrode signal from each other according to the time when the first electrode signal and the second electrode signal are received. However, in this method, as a signal for location measurement and a signal for additional information transmission are output at different times, the time when the location of the pen on a touch panel is measured is moved back.

Figure 1C:
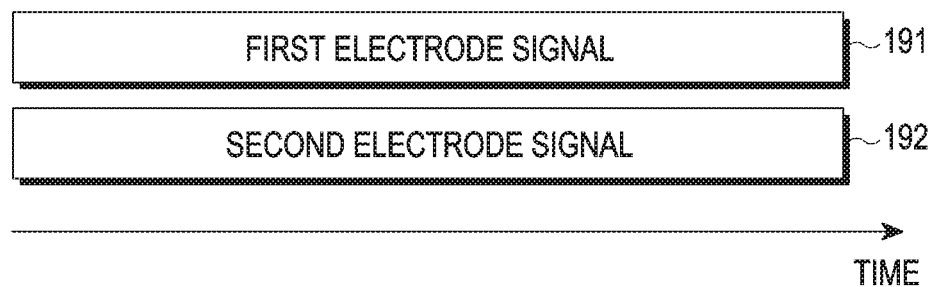

FIG. 1C is a conceptual view for describing a process of generating the first electrode signal and the second electrode signal in the pen 130 according to another embodiment of the present disclosure. The pen 130 may simultaneously perform transmission of a first electrode signal 191 and transmission of a second electrode signal 192. The first electrode signal 191 and the second electrode signal 192 may have different frequencies, such that the touch sensing device 100 may distinguish the first electrode signal 191 from the second electrode signal 192.

Figure 1D:
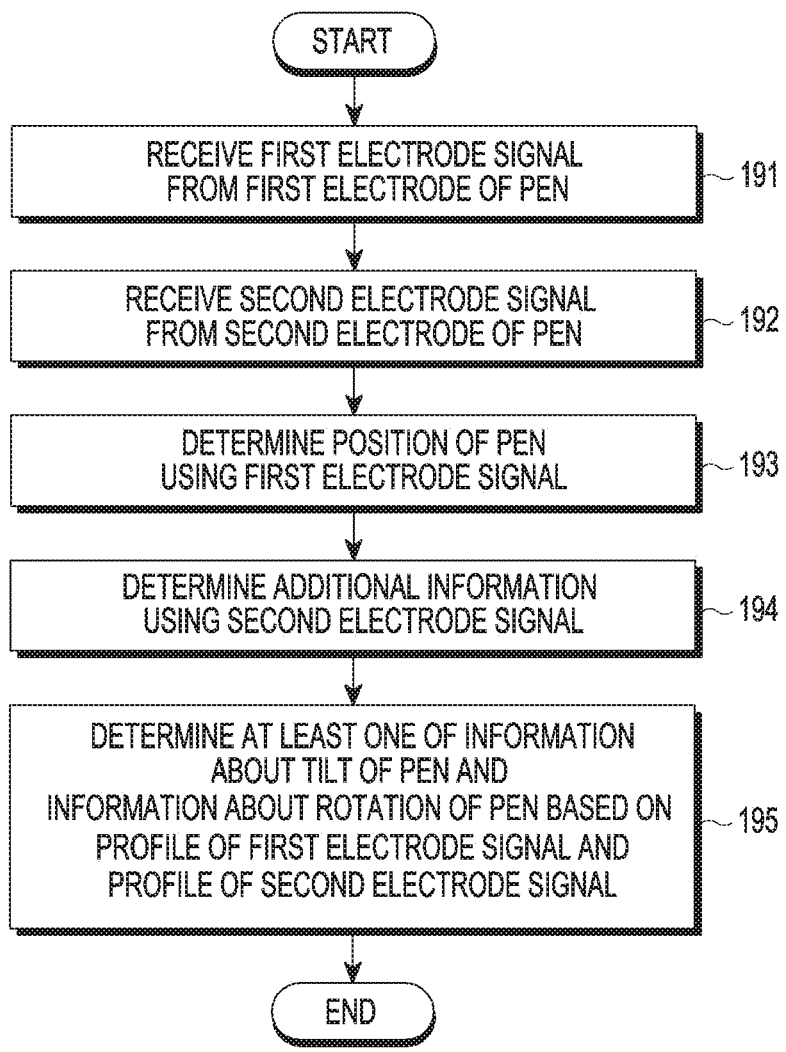
FIG. 1D is a flowchart for describing a control method of a touch sensing device according to various embodiments of the present disclosure.

FIG. 1D is a flowchart for describing a control method of a touch sensing device according to various embodiments of the present disclosure.

In operation 191, the touch sensing device may receive a first electrode signal from a first electrode of a pen. In operation 192, the touch sensing device may receive a second electrode signal from a second electrode of the pen. As described with reference to FIG. 1B or 1C, the touch sensing device may receive the first electrode signal and the second electrode signal at the same time or during different periods.

In operation 193, the touch sensing device may determine the location of the pen by using the first electrode signal. In operation 194, the touch sensing device may determine additional information by using the second electrode signal. In operation 195, the touch sensing device may determine at least one of information about the tilt of the pen and information about the rotation of the pen based on a profile of the first electrode signal and a profile of the second electrode signal.

Figure 1E:
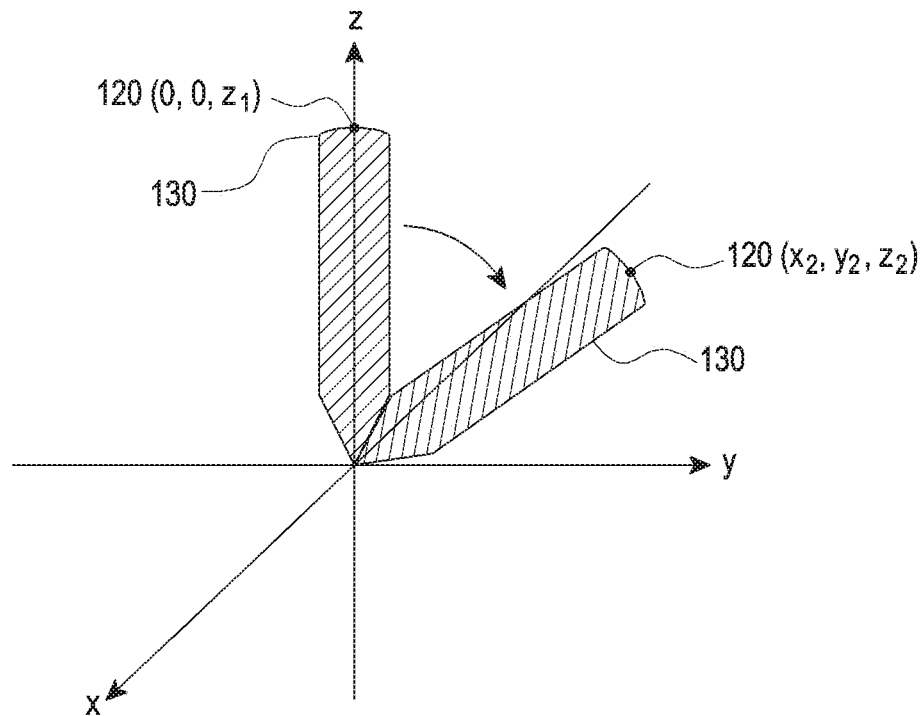
FIG. 1E is a conceptual view for describing tilt of a pen according to various embodiments of the present disclosure.

FIG. 1E is a conceptual view for describing the tilt of a pen according to various embodiments of the present disclosure. As illustrated in FIG. 1E, the pen 130 may stand upright in perpendicular to the ground, and in this case, the location of a first point 120 of the pen 130 may be $(0, 0, z_1)$. The pen 130 may be tilted with respect to the ground, and in this case, the location of the first point 120 of the pen 130 may be $(x_2, y_2, z_2)$. The touch sensing device, according to various embodiments of the present disclosure, may determine the tilt degree of the pen 130 by using the profile of the first electrode signal and the profile of the second electrode signal. For example, the touch sensing device may determine movement information of the first point 120. In another embodiment, the touch sensing device may determine the movement information of the first point in a spherical coordinate system other than an orthogonal coordinate system, and thus determine movement information of a second point in the spherical coordinate system as an angle defined in the spherical coordinate system.

Figure 1F:
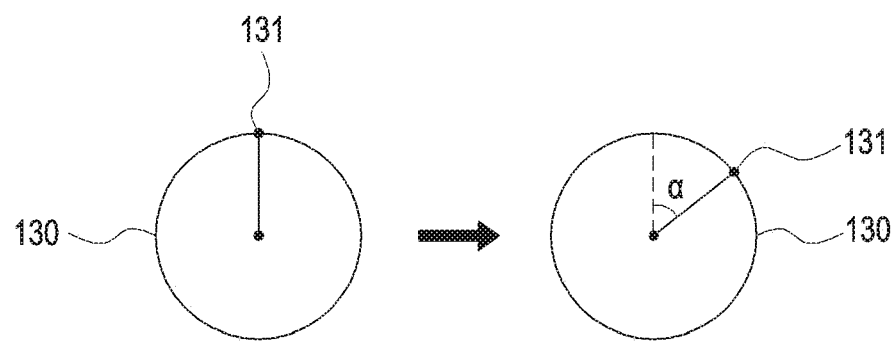
FIG. 1F is a plane view for describing rotation of a pen according to various embodiments of the present disclosure.

FIG. 1F is a plane view for describing the rotation of a pen according to various embodiments of the present disclosure. As illustrated in FIG. 1F, when viewed from the top, the pen 130 may have a circular form. The circular form is merely an example, and a cross-sectional form of the pen 130 is not limited. A first point 131 may be defined on a top surface of the pen 130, and a straight line connecting the first point 131 with the origin may form an angle of a with a reference line by rotation. The touch sensing device 100, according to various embodiments of the present disclosure, may determine rotation information of the pen 130, e.g., the angle of $\alpha$, by using the profile of the first electrode signal and the profile of the second electrode signal.

Figure 2:
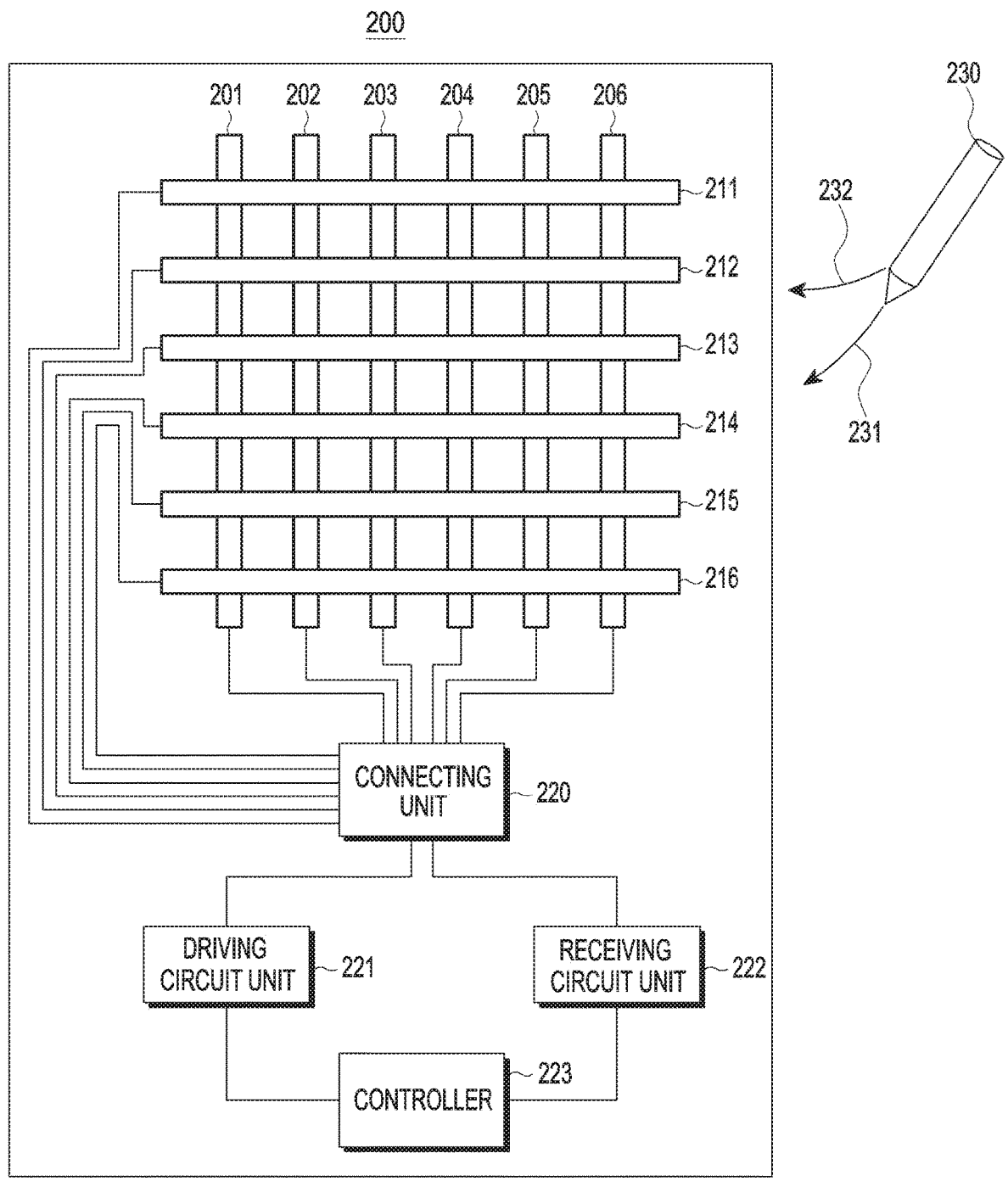
FIG. 2 is a conceptual view for describing a detailed structure of a touch sensing device according to various embodiments of the present disclosure.

FIG. 2 is a conceptual view for describing a detailed structure of a touch sensing device according to various embodiments of the present disclosure.

As illustrated in FIG. 2, a touch sensing device 200 may include a plurality of electrodes 201 through 206 and 211 through 216 arranged therein. The electrodes 201 through 206 extending in the vertical direction may be intended to measure the location in the horizontal direction (an x-axis direction) of a pen 230, and the electrodes 211 through 216 extending in the horizontal direction may be intended to measure the location in the horizontal direction (a y-axis direction) of the pen 230. Herein, the electrodes of the touch sensing device 200 may be divided into first-axis electrodes and second-axis electrodes according to extending directions thereof.

The electrodes 201 through 206 and 211 through 216 may be implemented with transparent conductors such as indium tin oxide (ITO), and it would be easily understood by those of ordinary skill in the art that they are not particularly limited as long as they may generate a voltage using an electric field formed nearby. Although it is illustrated in FIG. 2 that the electrodes 201 through 206 extending in the vertical direction and the electrodes 211 through 216 extending in a stripe form in the horizontal direction are orthogonal to one another, it is merely an example and they may be implemented in various forms such as a diamond form, etc., and at various intersection angles. In addition to the grid in which the electrodes in the horizontal direction intersect the electrodes in the vertical direction, a structure in which electrodes in the form of an N×M array are connected with a circuit unit through respective connecting electrodes is also possible.

The electrodes 201 through 206 and 211 through 216 may be connected to a connecting unit 220. The connecting unit 220 may include a switch for switching on/off a driving circuit unit 221 and a receiving circuit unit 222 such that any one of the driving circuit unit 221 and the receiving circuit unit 222 is connected or is not connected to the electrodes 201 through 206 and 211 through 216.

Once an electric field is generated from the pen 230, the electric field may propagate to the proximity of the electrodes 201 through 206 and 211 through 216. Each of the electrodes 201 through 206 and 211 through 216 may generate an electric signal by an ambient electric field. The electric signal from each of the electrodes 201 through 206 and 211 through 216 may be output from the receiving circuit unit 222.

The touch sensing device 200 may give a channel number to each of the electrodes 201 through 206 and 211 through 216 and determine the strength of a received signal for each channel. The touch sensing device 200, e.g., a controller 223, may determine the location of the pen 230 by using the strength of the channel-specific signal.

The controller 223 may determine the location of the pen 230 by using the strength of the channel-specific signal. For example, when the first electrode signal 231 has a first frequency, the controller 223 may determine the location of the pen 230 by using the strength of a channel-specific signal at the first frequency. For example, when the first electrode signal 231 is received during the first period, the controller 223 may determine the location of the pen 230 by using the strength of a channel-specific signal during the first period. The controller 223 may be implemented in the form of a processor, and may include one or more of a central processing unit (CPU), an application processor (AP), and a communication processor (CP). The controller 223 may be implemented in the form of a micro controlling unit (MCU) or a mini-computer.

The controller 223 may determine additional information of the pen 230 by using a second electrode signal 232. For example, when the second electrode signal 232 has a second frequency, the controller 223 may determine the additional information of the pen 230 by using a signal at the second frequency. For example, when the second electrode signal 232 is received during a second period, the controller 223 may determine the additional information of the pen 230 by using a signal received during the second period.

The controller 223 may determine at least one of the tilt information and the rotation information of the pen 230 by using at least one of the profile of the first electrode signal 231 and the profile of the second electrode signal 232.

The pen 230 may include a power source such as a battery therein. Thus, the pen 230 may generate an electric field by using power from the power source.

In various embodiments of the present disclosure, the touch sensing device 200 may include a capacitance change sensing circuit that senses contact of a conductive object. In this case, when sensing contact of a pen of a type, the touch sensing device 200 may not calculate information related to the location of the contact of the conductive object sensed by the capacitance change sensing circuit or may not transmit the information to a control circuit. As a result, when the user writes on the touch sensing device 200 while holding a pen with a hand, the touch sensing device 200 may not process contact of the hand.

The driving circuit unit 221 may generate a drive signal for sensing contact of a finger. When the finger contacts an electrode and when the finger does not contact the electrode, a capacitance may change in the electrode or between electrodes. The controller 223 may measure capacitance by applying the drive signal to an electrode in the driving circuit unit 221, thus determining whether the finger contacts and the location of the contact of the finger.

The connecting unit 220 may sequentially connect the electrodes 201 through 206 and 211 through 216 to the receiving circuit unit 222 which may then process electric signals from the electrodes 201 through 206 and 211 through 216 and deliver the electric signals to the controller 223. For example, the receiving circuit unit 222 may include a filter that passes a specific frequency therethrough. When the first electrode signal 231 and the second electrode signal 232 have the first frequency and the second frequency, respectively, the receiving circuit unit 222 may include a filter for passing the first frequency therethrough and a filter for passing the second frequency therethrough, thus separately processing the first electrode signal 231 and the second electrode signal 232 and delivering them to the controller 223. The receiving circuit unit 222 may further include an amplifier that amplifies the strength of a signal or an analog-to-digital converter (ADC) that converts an analog signal into a digital signal.

A display that displays image information may be arranged under the electrodes 201 through 206 and 211 through 216, thus implementing a touch screen in which image display and touch sensing are performed at the same time.

Figure 3:
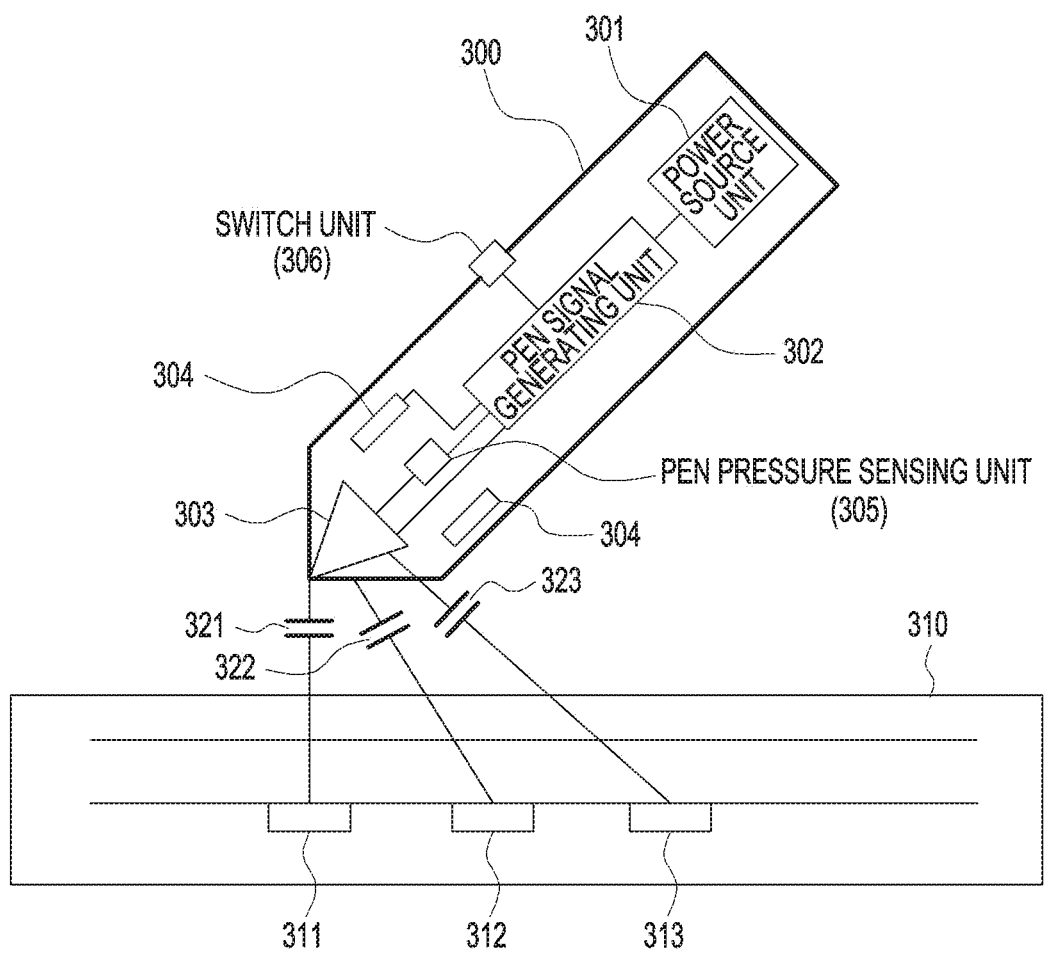
FIG. 3 is a conceptual view for describing capacitance formation between a pen and an electrode of a touch sensing device according to various embodiments of the present disclosure.

FIG. 3 is a conceptual view for describing capacitance formation between a pen and an electrode of a touch sensing device according to various embodiments of the present disclosure. As illustrated in FIG. 3, a touch sensing device 310 may include a plurality of electrodes 311 through 313. A pen 300 may include a power source unit 301 including a battery such as a primary cell, a secondary cell, or the like. The power source unit 301 may provide power, and a pen signal generating unit 302 may generate a pen signal using the power. The pen signal generating unit 302 may generate electric signals for generating a first electrode signal that is configured for the touch sensing device 310 to determine the location of the pen 300 and a second electrode signal that is configured for the touch sensing device 310 to determine additional information of the pen 300. The pen signal generating unit 302 may generate electric signals such that the first electrode signal and the second electrode signal have different frequencies. The pen signal generating unit 302 may generate the first electrode signal and the second electrode signal on a periodic basis. The pen signal generating unit 302 may include hardware such as an oscillator for sine wave generation, an amplifier, a filter, and so forth.

The pen 300 may include a first electrode 303 and a second electrode 304. The pen signal generating unit 302 may output an electric signal for the generated first electrode signal to the first electrode 303 and an electric signal for the generated second electrode signal to the second electrode 304. The first electrode 303 may form capacitances 321, 322, and 323 with electrodes 311 through 313 of the touch sensing device 310, respectively. Thus, the first electrode signal from the first electrode 303 may be delivered to the electrodes 311 through 313 of the touch sensing device 310 through the capacitances 321, 322, and 323. Although not shown, the second electrode 304 may form capacitances with the electrodes 311 through 313 of the touch sensing device 310, respectively, and the second electrode signal may be delivered to the electrodes 311 through 313 of the touch sensing device 310 through the capacitances.

The pen 300 may include a pen pressure sensing unit 305 that senses a contact pressure of the pen tip, and may include a switch unit 306 that may be switched on/off. The pen signal generating unit 302 may generate electric signals for the first electrode signal and the second electrode signal by using information about the pen pressure received from the pen pressure sensing unit 305. The pen signal generating unit 302 may generate electric signals for the first electrode signal and the second electrode signal by using information about on/off states of the switch unit 306. The pen signal generating unit 302 may generate an electric signal for the second electrode signal including identification information of the pen 300.

Figure 4:
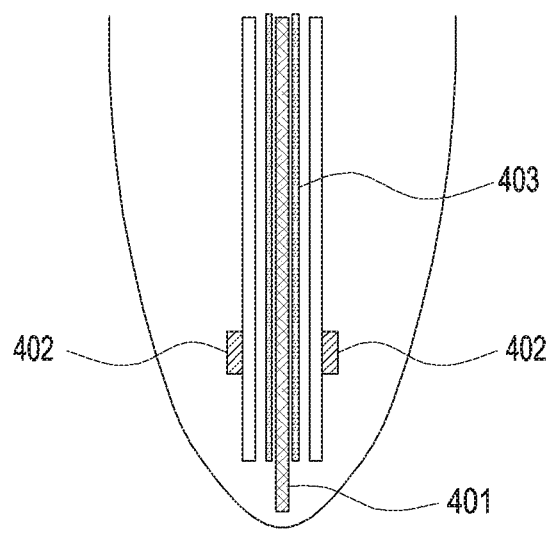
FIG. 4 is a conceptual view of a first electrode and a second electrode according to various embodiments of the present disclosure.

FIG. 4 is a conceptual view of a first electrode and a second electrode according to various embodiments of the present disclosure. A first electrode 401 may be arranged to pass through the center of a pen 400. A second electrode 402 may be arranged physically apart from the first electrode 401, and a shielding unit 403 may be arranged between the first electrode 401 and the second electrode 402. A first electrode signal from the first electrode 401 and a second electrode signal from the second electrode 402 may not interfere with each other through the shielding unit 403. With the shielding unit 403, the profile of the first electrode signal may have a particular form. More specifically, a part hidden by the shielding unit 403 may be shielded from an electric field generated from the first electrode 401, such that the profile of the first electrode signal may be induced into a particular form. Such a shielding unit may be implemented in a simple manner that grounds a conductor.

Hereinbelow, referring to FIGS. 5 through 12, delivery of various information using the first electrode signal and the second electrode signal will be described.

Figure 5:
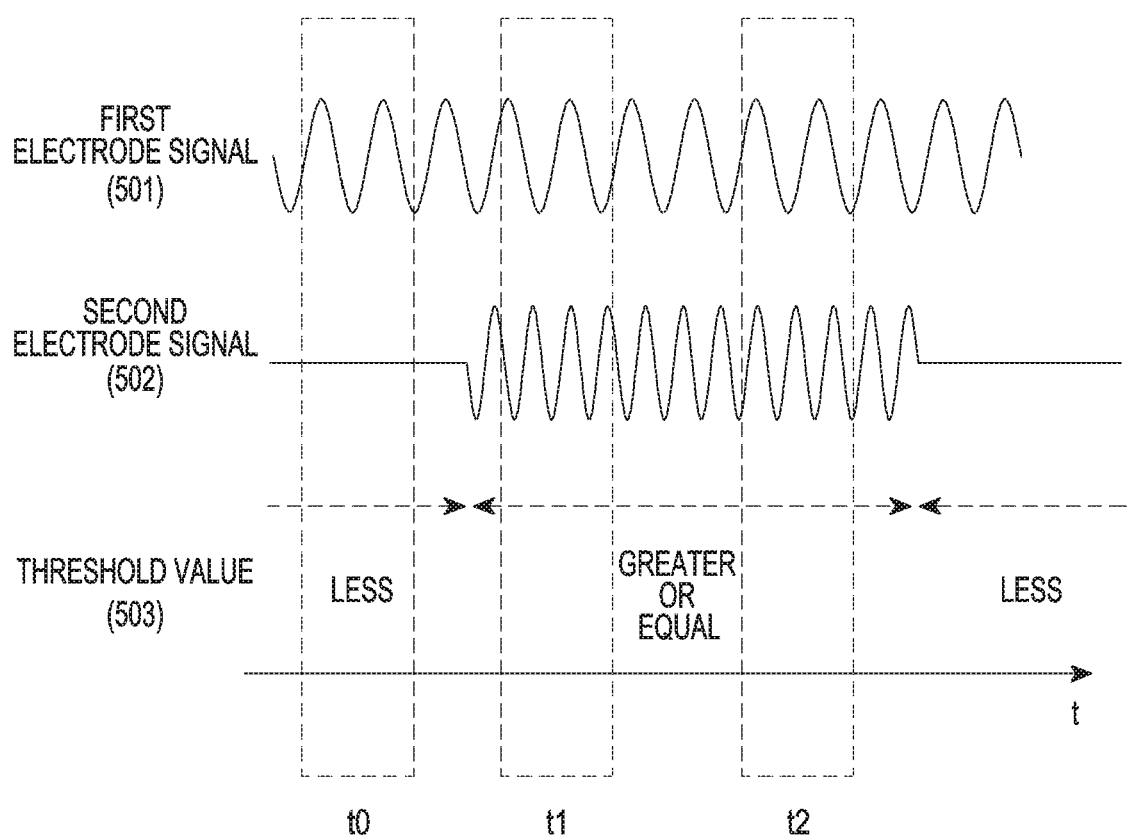
FIG. 5 illustrates waveforms of electrode signals according to various embodiments of the present disclosure.

FIG. 5 illustrates waveforms of electrode signals according to various embodiments of the present disclosure.

A first electrode signal 501 may be a sinusoidal signal. A second electrode signal 502 may also be a sinusoidal signal, and in the embodiment of FIG. 5, the first electrode signal 501 and the second electrode signal 502 may have different frequencies. In various embodiments of the present disclosure, the frequency of the second electrode signal 502 may be variable according to pen pressure. For example, the pen signal generating unit in the pen may determine a frequency corresponding to pen pressure information from the pen pressure sensing unit and output an electric signal having the determined frequency to the second electrode which may then generate the second electrode signal 502 having the determined frequency.

In various embodiments of the present disclosure, the pen may be configured to output the second electrode signal when the pen pressure is greater than or equal to a threshold value 503. Thus, when the pen pressure is less than the threshold value 503, the second electrode signal 502 may not be output.

The touch sensing device may receive the first electrode signal 501 for each channel of an electrode. The strength of an electric signal output from each channel of an electrode of the touch sensing device by the first electrode signal 501 may differ according to the distance between the electrode and the pen. The touch sensing device may determine the location of the pen based on the strength of the electric signal for each channel of the electrode. The touch sensing device may measure pen pressure according to the frequency of the second electrode signal 502.

The touch sensing device may measure the first electrode signal and the second electrode signal even when performing sensing during a period (e.g., t1 or t2) in which pen pressure is greater than or equal to a threshold value. The touch sensing device may determine the location of the pen by sensing the first electrode signal even when performing sensing during a period (e.g., t0) in which pen pressure is less than the threshold value. In a selected period, the pen pressure may be greater than or equal to the threshold value in a part of the period and may be less than the threshold value in the other part of the period. In this case, the touch sensing device may determine contact of the pen tip based on the magnitude of the second electrode signal.

As mentioned before, the touch sensing device according to the present disclosure may be arranged together with a display and may be implemented as a touch screen. The display may generate noise having various frequencies when being driven. The generated noise may disturb the determination of accurate touch information. For this reason, it may be necessary to sense an electrode signal from the pen by avoiding a period where much noise is caused by the display. The touch sensing device, according to various embodiments of the present disclosure, may transmit information about a drive timing of the display to the pen. The information about the drive timing of the display may be an HSYNC signal or a VSYNC signal. The pen may determine transmission timings of the first electrode signal and the second electrode signal based on the received drive timing information of the display. For example, the pen may transmit the first electrode signal and the second electrode signal during a period where the drive signal of the display does not change, and the touch sensing device may receive an electrode signal in a period when noise caused by the display is small, thus improving a signal-to-noise ratio (SNR) of the received signal. In this case, the pen may further include an additional circuit capable of changing the drive timing of the electrode signal according to the drive timing information received from the touch sensing device.

As illustrated in FIG. 5, when the pen is configured to transmit the first electrode signal and the second electrode signal for pen pressure greater than or equal to the threshold value, then the touch sensing device may sense the location of the pen and the additional information in a period regardless of the drive timing of the pen, removing a need for the touch sensing device to transmit separate timing information to the pen. Consequently, the pen does not need to include a receiving unit that receives the timing information from the touch sensing device and a circuit unit that changes the drive timing of the signal according to the received information, thus having a simple structure. Moreover, the touch sensing device is capable of sensing a pen signal in a period without transmitting a driving timing, etc. to the pen, thus saving a time required for pen driving.

Figure 6:
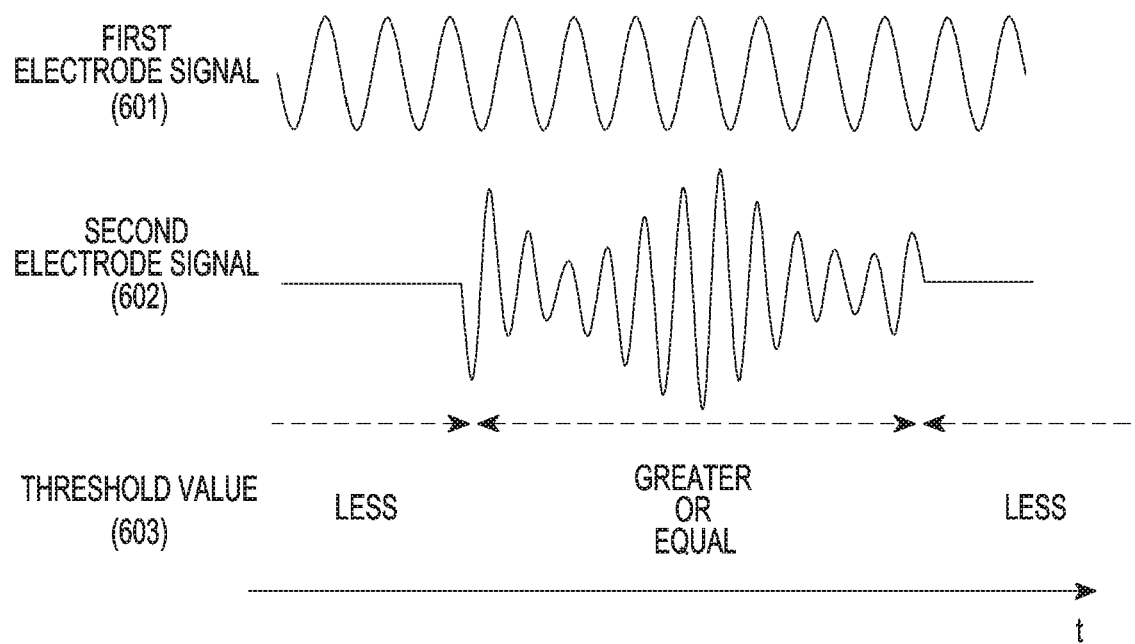
FIG. 6 illustrates waveforms of electrode signals according to various embodiments of the present disclosure.

FIG. 6 illustrates waveforms of electrode signals according to various embodiments of the present disclosure.

The pen may continuously transmit a first electrode signal 601. The pen may transmit a second electrode signal 602 in a period when pen pressure is greater than or equal to a threshold value 603. The pen, according to various embodiments of the present disclosure, may generate the second electrode signal 602 based on pen pressure. The pen may generate the second electrode signal 602 using Equation 1.

$$X(t)=A\cos(\omega_1 t)+B\cos(\omega_2 t) \quad \text{Equation 1}$$

ω1 and ω2 may be preset angular frequencies, and A and B may be changeable amplitudes. The pen may adjust a ratio of A:B based on pen pressure. For example, when a first pen pressure is sensed, the pen may determine A/B to be 1.2; when a second pen pressure is sensed, the pen may determine A/B to be 1.3. The touch sensing device may determine A/B by processing the received second electrode signal 602. For example, the touch sensing device may determine the ratio of A/B by performing Fourier transformation with respect to the received second electrode signal 602 and calculate pen pressure based on the determined ratio.

Figure 7:
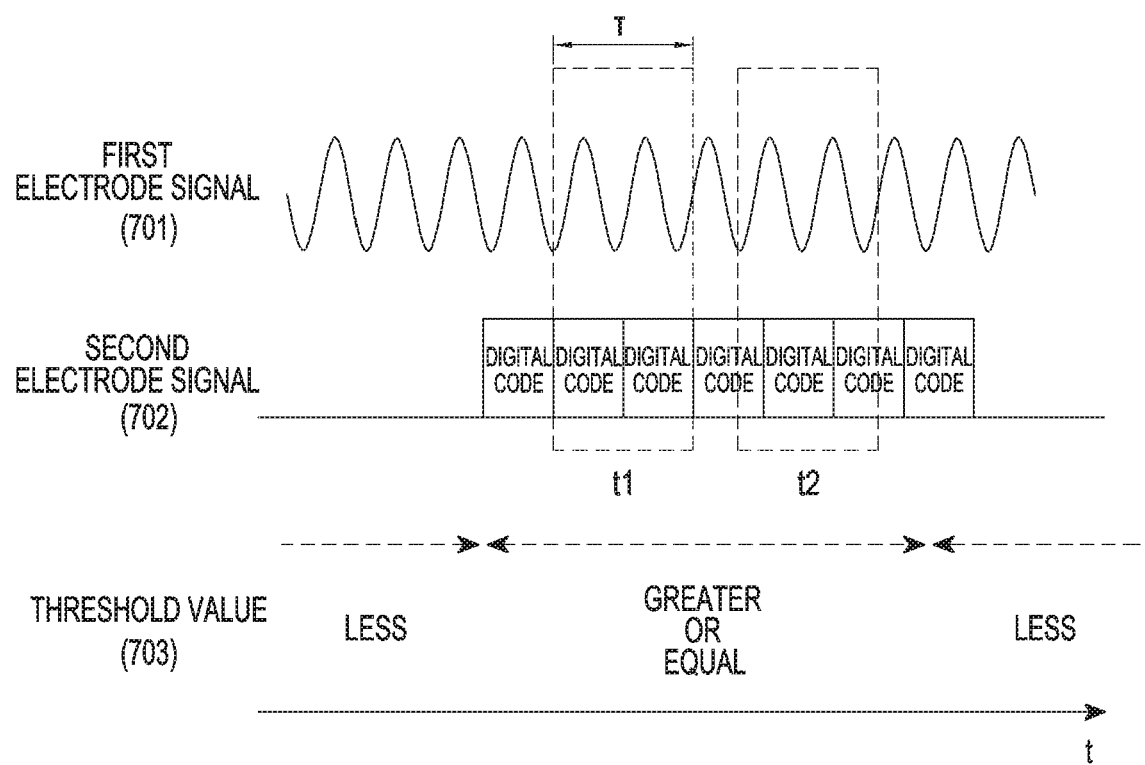
FIG. 7 illustrates waveforms of electrode signals according to various embodiments of the present disclosure.

FIG. 7 illustrates waveforms of electrode signals according to various embodiments of the present disclosure.

The pen may continuously transmit a first electrode signal 701. The pen may transmit a second electrode signal 702 in a period when pen pressure is greater than or equal to a threshold value 703. The pen, according to various embodiments of the present disclosure, may transmit the second electrode signal 702 of a digital code. Thus, the digital code for additional information may be included in the second electrode signal 702. For example, for a sampling time of τ for the additional information of the touch sensing device, when a minimum of 2 sets of digital codes are included in τ, a minimum of one set of additional information may be obtained even when the touch sensing device performs sampling in a period (e.g., t1 or t2). More specifically, when the touch sensing device performs sampling in a period of t2, at least one digital codes may be sensed.

Figure 8A:
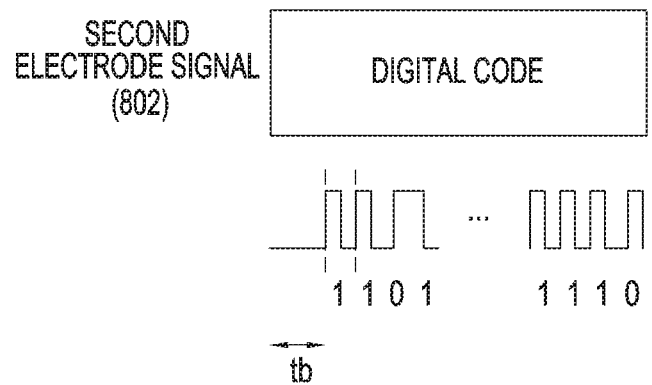
FIGS. 8A through 8C illustrate waveforms of electrode signals related to a digital code according to various embodiments of the present disclosure.
Figure 8B:
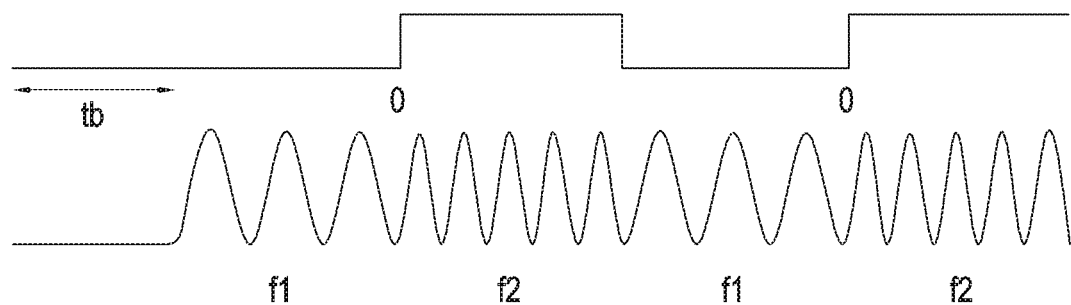
Figure 8C:
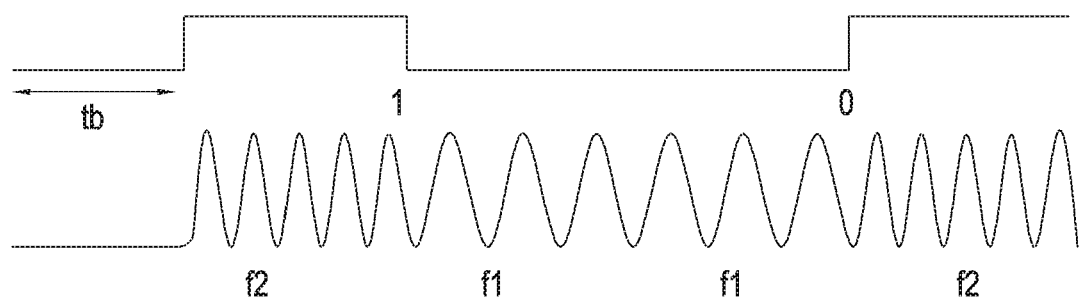

FIGS. 8A through 8C illustrate waveforms of electrode signals related to a digital code according to various embodiments of the present disclosure.

As illustrated in FIG. 8A, one set of a digital code of a second electrode signal 802 may include a blank time tb and a bit sequence indicating "0" and "1". FIGS. 8B and 8C illustrate digital codes when Manchester codes are used. As illustrated in FIG. 8B, to configure a bit indicating "0", a signal having a frequency f2 continuing from a signal having a frequency f1 may be implemented, and to configure a bit indicating "1", the signal having the frequency of f1 continuing from the signal having the frequency of f2 may be implemented. Thus, a start timing of a digital code may be recognized merely with the blank time tb without a separate start bit. More specifically, the touch sensing device may determine a timing when the signal having the frequency of f1 or f2 is sensed to be a start timing. When the signal for the additional information is implemented in this way, the signal having the frequency of f1 or f2 is generated in a period except for the blank time tb, such that a stable SNR may be secured when the tilt information of the pen is determined, which will later be described in detail. In FIGS. 5 through 8C, the second electrode signal is generated when the pen pressure is greater than or equal to a preset threshold value, and the first electrode signal is generated when the pen pressure is less than the preset threshold value, thereby preventing unnecessary power consumption. In various embodiments of the present disclosure, the pen may be configured to output the second electrode signal, regardless of the pen pressure.

Figure 9:
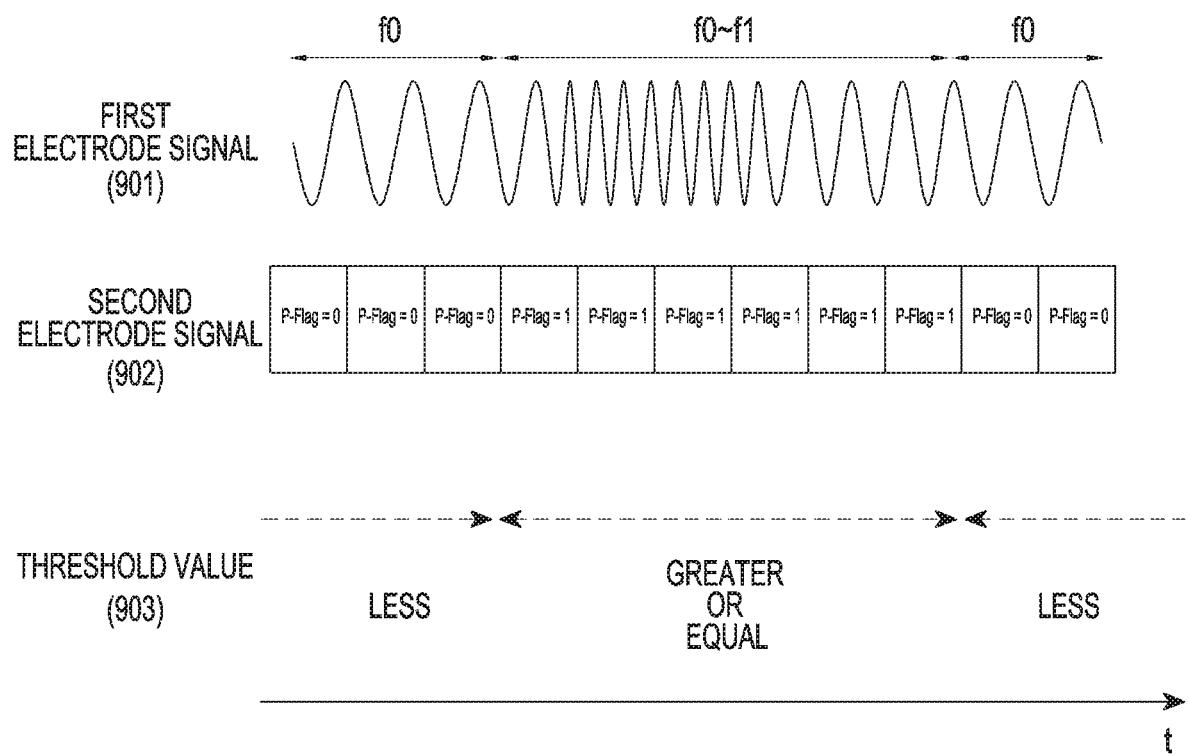
FIG. 9 illustrates waveforms of electrode signals according to various embodiments of the present disclosure.

FIG. 9 illustrates waveforms of electrode signals according to various embodiments of the present disclosure.

The pen may continuously transmit a first electrode signal 901 or transmit a second electrode signal 902. The second electrode signal 902 may be implemented in the form of a digital code including a flag having "0" or "1". For example, when a contact pressure of the pen tip is greater than or equal to a threshold value 903, the pen may set a flag P_flag to 1; when the contact pressure of the pen tip is less than the threshold value 903, the pen may set the flag P_flag to 0. The pen may change the frequency of a first electrode signal 901 based on a contact pressure. The frequency of the first electrode signal 901 may be changeable in a range of f0 to f1, and the relationship between contact pressure and frequency may be shared in advance between the pen and the touch sensing device. Thus, the touch sensing device may determine the contact pressure by recognizing the frequency of the first electrode signal 901. Meanwhile, the first electrode signal 901 may include a noise component, and a frequency recognized by the touch sensing device may have an error due to noise. The touch sensing device may recognize a flag of the second electrode signal 902 not to process a contact pressure less than a threshold value, thus preventing serious malfunction such as a case where notes are taken when the notes should not be taken by the pen. Moreover, once sensing a flag of 1, the touch sensing device may determine that an input is generated with a minimum pen pressure even when the magnitude of the first electrode signal 901 is small, and may display the taken notes, etc.

Figure 10:
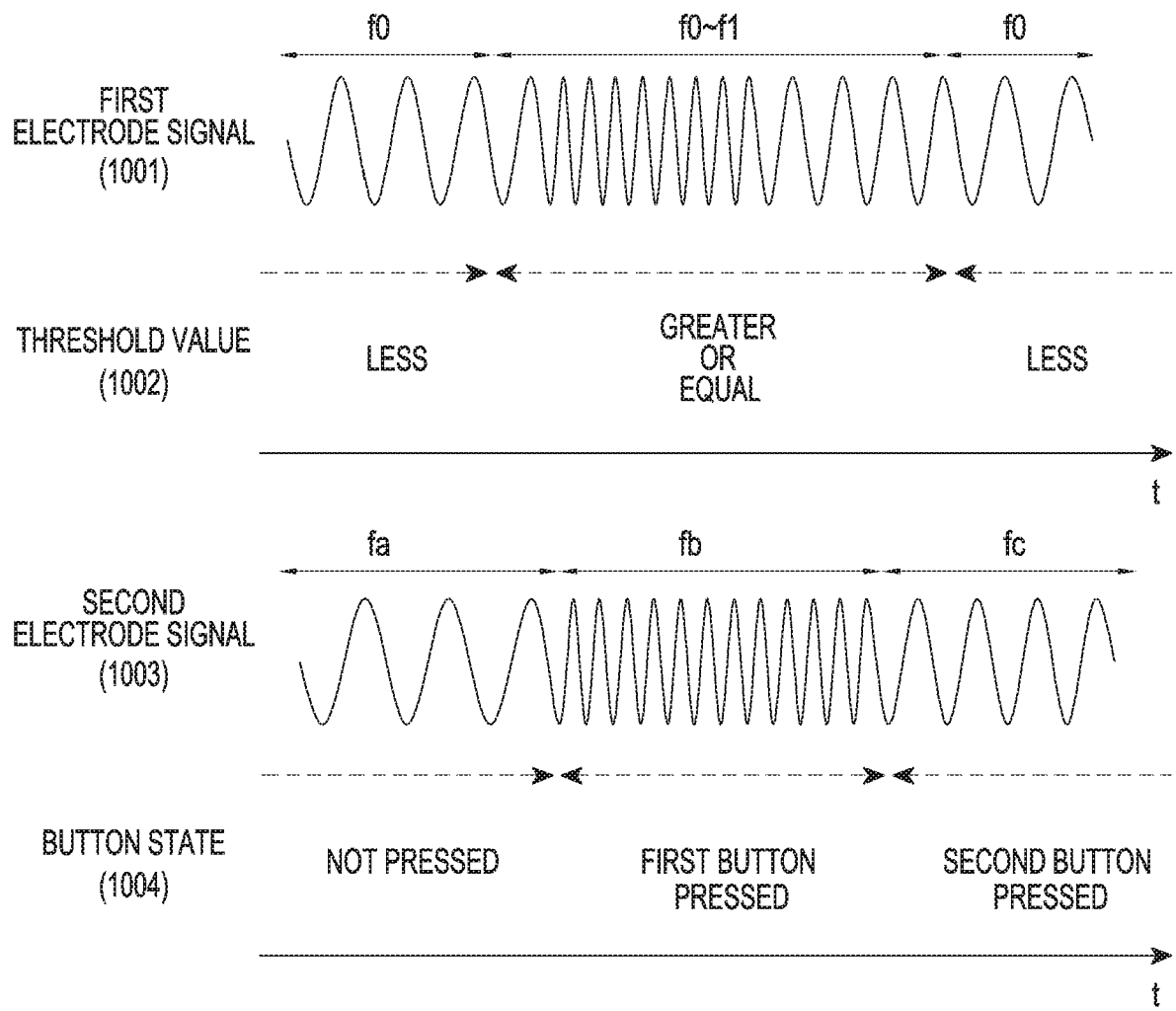
FIG. 10 illustrates waveforms of electrode signals according to various embodiments of the present disclosure.

FIG. 10 illustrates waveforms of electrode signals according to various embodiments of the present disclosure.

Thus, when the pen pressure is less than a threshold value 1002, the pen may transmit a first electrode signal 1001 at a frequency of f0. When the pen pressure is greater than or equal to the threshold value 1002, the pen may transmit the first electrode signal 1001 at a frequency in a range over f0 and less than or equal to f1. The pen may change the frequency of the first electrode signal 1001, and the relationship between contact pressure and the frequency of the first electrode signal 1001 may be shared in advance between the pen and the touch sensing device. Thus, the touch sensing device may determine the contact pressure by recognizing the frequency of the first electrode signal 1001.

Meanwhile, a second electrode signal 1003 may be used to determine whether a first button or a second button included in the pen is pressed. For example, when any button is not pressed in a button state 1004, the pen may transmit the second electrode signal 1003 having a frequency of fa. When it is determined that a first button is pressed in the button state 1004, the pen may transmit the second electrode signal 1003 having a frequency of fb. When it is determined that a second button is pressed in the button state 1004, the pen may transmit the second electrode signal 1003 having a frequency of fc. The touch sensing device may determine the button state 1004 included in the pen by recognizing the frequency of the second electrode signal 1003.

In various embodiments of the present disclosure, the second electrode signal 1003 may include identification information of the pen, and so forth. Since the button state 1004 or the identification information of the pen may have a relatively small change, they may be efficiently transmitted by being separated from location information and pen pressure information which have a relatively large change.

Meanwhile, to implement a light sense of handwriting, the touch sensing device may have to sense a fine pen pressure. When the sensitivity of an electrode signal of the touch sensing device is raised, that is, the touch sensing device is configured to react to even a fine pen pressure, any note may not be taken in spite of contact of the pen or notes may be taken in spite of non-contact of the pen, if the frequency of the first electrode signal 1001 changes due to noise. Therefore, an auxiliary method for accurately determining the contact of the pen may be introduced. Table 1 shows an example in which the second electrode signal 1003 including the additional information includes information about the contact of the pen tip.

TABLE 1

| Frequency | Button state | Tip |
|---|---|---|
| fa | No button pressed | Not pressed |
| fb | First button pressed | Not pressed |
| fc | Second button pressed | Not pressed |
| fd | No button pressed | Pressed |
| fe | First button pressed | Pressed |
| Ff | Second button pressed | Pressed |

By using the foregoing table, the touch sensing device may determine a contact state of the tip and a contact state of the button quickly.

Figure 11:
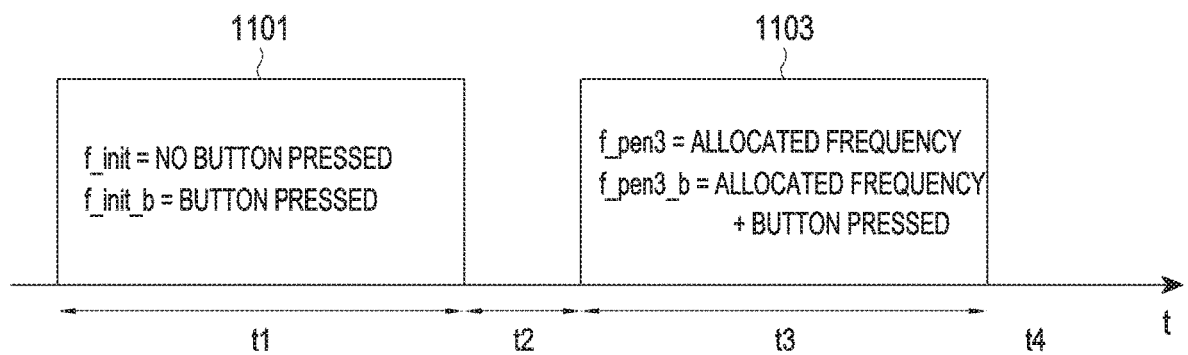
FIG. 11 is a conceptual view of a second electrode signal according to various embodiments of the present disclosure.

FIG. 11 is a conceptual view of a second electrode signal according to various embodiments of the present disclosure. In the embodiment of FIG. 11, the frequency may be changed according to whether a button is pressed.

When the pen approaches the touch sensing device, a signal 1101 during the first period t1 from a second electrode, generated from the pen, may have an initial frequency of f_init_b in a "button pressed" state where a button is pressed, and may have an initial frequency of f_init in a "no button" state where no button is pressed. The touch sensing device may determine whether a button included in the pen is pressed, by measuring the frequency of the second electrode signal. Meanwhile, the touch sensing device may transmit a pen control signal to the pen during the second period t2. In this case, the pen may not generate the second electrode signal to receive a pen control signal, and may receive the pen control signal. For example, the touch sensing device may transmit an order in which the pen contacts the touch sensing device during the second period t2. In the current embodiment, assuming that the touch sensing device has already sensed contact of two pens, the touch sensing device may transmit information indicating that the contacting pen is a third pen contacting the touch sensing device to the pen during the second period t2. The pen may generate the second electrode signal 1003 having a frequency that satisfies information 1103 received during a third period t3. For example, the pen, having recognized that the pen is the third pen contacting the touch sensing device, may generate the second electrode signal having a frequency of f_pen3 or f_pen3_b corresponding to the third pen. f_pen3_b may mean a frequency corresponding to the "button pressed" state. In this case, the pen may set the first electrode signal to a frequency corresponding to the third pen. Thereafter, the pen may not generate any signal to receive the pen control signal during a fourth period t4.

Figure 12:
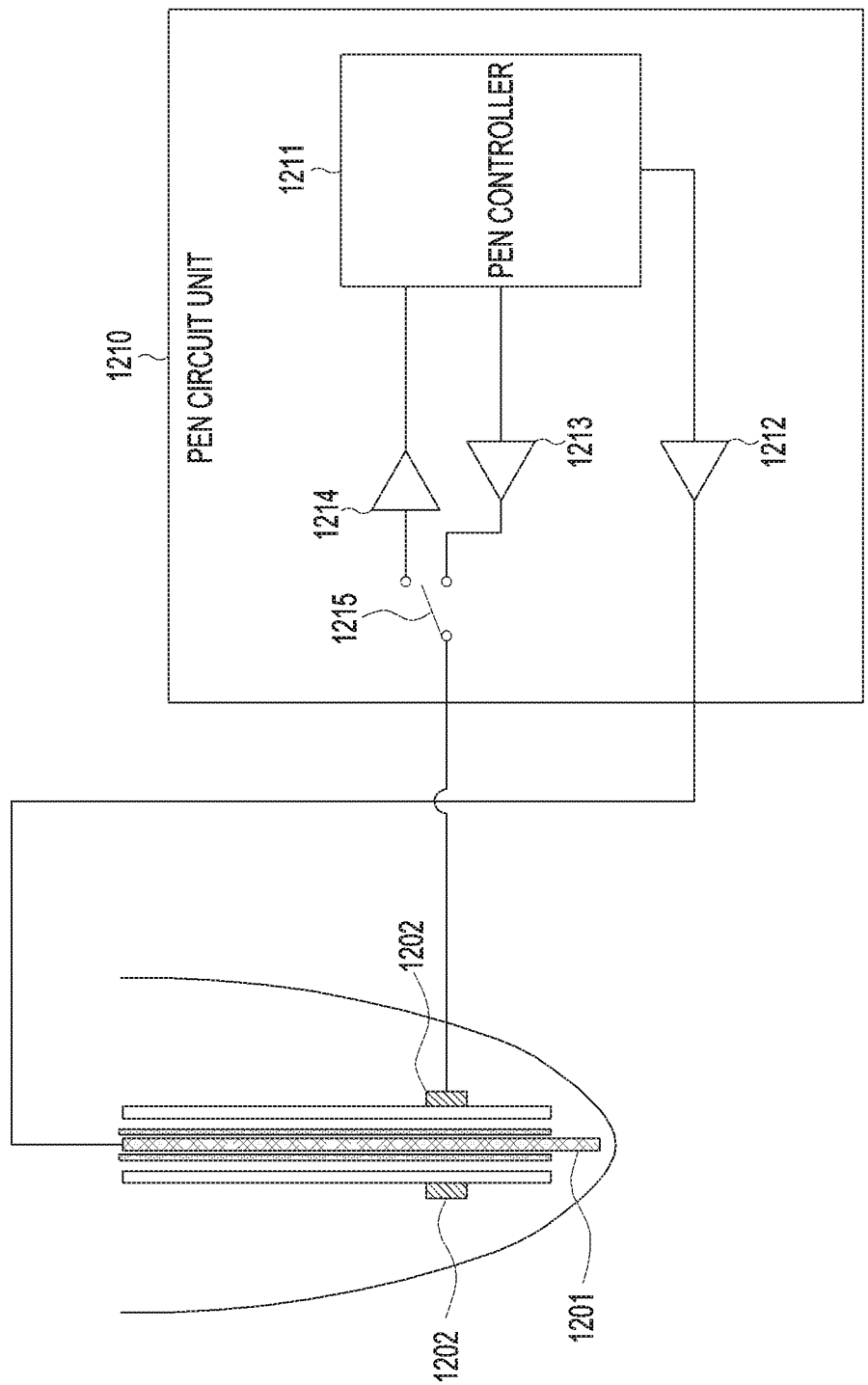
FIG. 12 is a conceptual view of a pen according to various embodiments of the present disclosure.

FIG. 12 is a conceptual view of a pen according to various embodiments of the present disclosure.

As illustrated in FIG. 12, the pen, according to various embodiments, may include a first electrode 1201 and a second electrode 1202. The first electrode 1201 may be arranged in the center of the pen and may form a pen tip. The second electrode 1202 may be arranged physically apart from the first electrode 1201. The first electrode 1201 and the second electrode 1202 may be connected to a pen circuit unit 1210. More specifically, a pen controller 1211 may generate an electric signal for the first electrode signal and amplify the electric signal with a first amplifier 1212. The amplified signal may be output to the first electrode 1201. The pen controller 1211 may be configured in the form of a simple logic circuit, or in the form of a processor for implementing a more complex function, for example, a micro controlling unit (MCU) or a mini computer.

As described above, the pen controller 1211 may generate an electric signal by using a signal such as spherical waves, sine waves, etc., generated from a separately provided oscillator. In various embodiments of the present disclosure, the pen controller 1211 may include an oscillator. The first amplifier 1212 may amplify an input electric signal and deliver the amplified electric signal to the first electrode 1201. The first electrode 1201 may include a conductive material, and thus may output a first electrode signal based on the input electric signal. Meanwhile, the pen controller 1211 may output an electric signal for generating a second electrode signal to a second amplifier 1213. The pen controller 1211 may change the frequency of an electric signal based on pen pressure, a button state, etc., or generate an electric signal in a digital format. The second amplifier 1213 may amplify the input electric signal and output the amplified electric signal to the second electrode 1202 which may output a second electrode signal based on the input electric signal. Meanwhile, a pen control signal received from the touch sensing device may be input to the second electrode 1202 depending on the implementation of the second electrode 1202. The second electrode 1202 may include a conductive material, and thus may output an electric signal to a third amplifier 1214 based on an ambient electric field, i.e., a pen control signal. The third amplifier may amplify the input electric signal and output the amplified electric signal to the pen controller 1211 which may then control at least one of pen operations by using the input electric signal. The pen controller 1211 may connect a switch 1215 to the second amplifier 1213 during a preset transmission period of the second electrode signal and may connect the switch 1215 to the third amplifier 1214 during a preset reception period of the pen control signal. A feature in which the second electrode 1202 receives the pen control signal is merely an example, and a pen, according to another embodiment, may receive the pen control signal from the touch sensing device by using the first electrode 1201.

So far, delivery of various information using the first electrode signal and the second electrode signal has been described with reference to FIGS. 5 through 12. Hereinbelow, a detailed description will be made of a feature in which at least one of the tilt information of the pen and the rotation information of the pen is determined using the first electrode signal and the second electrode signal.

Figure 13A:
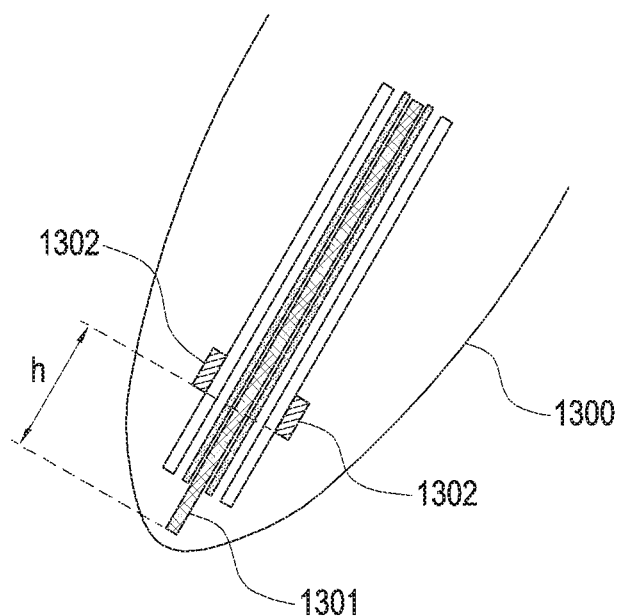
FIG. 13A is a conceptual view for describing a tilted state of a pen according to various embodiments of the present disclosure.

FIG. 13A is a conceptual view for describing a tilted state of a pen according to various embodiments of the present disclosure. As illustrated in FIG. 13A, an end of a first electrode 1301 of a pen 1300 and an end of a second electrode 1302 of the pen 1300 may be arranged to have a difference of h in a vertical direction. The first electrode 1301 may be arranged closer to the touch sensing device than the second electrode 1302 when the pen 1300 contacts the touch sensing device.

Figure 13B:
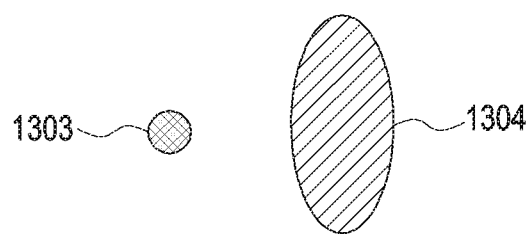
FIG. 13B illustrates a profile of a first electrode signal and a profile of a second electrode signal according to various embodiments of the present disclosure.
Figure 13C:
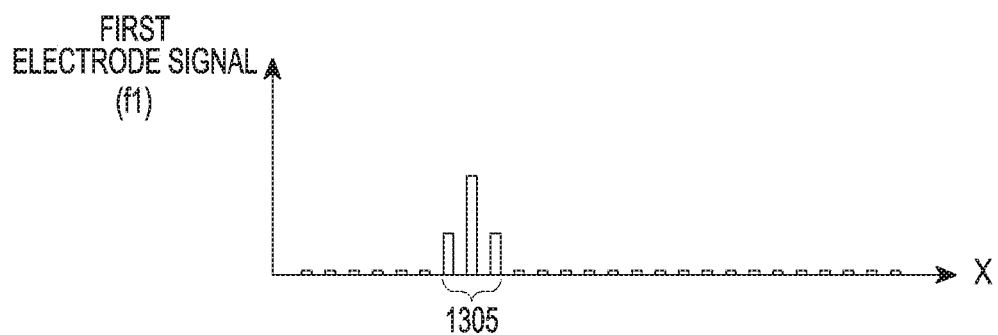
FIG. 13C is a graph illustrating a magnitude of a first electrode signal with respect to a channel.
Figure 13D:
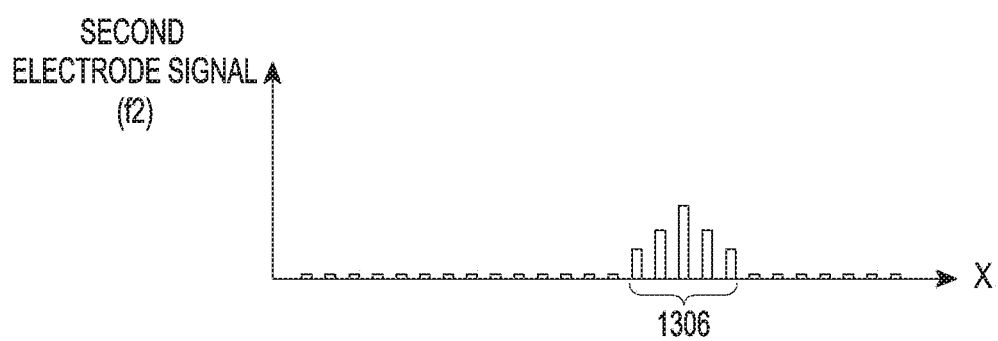
FIG. 13D is a graph illustrating a magnitude of a second electrode signal with respect to a channel.

FIG. 13B illustrates a profile 1303 of a first electrode signal and a profile 1304 of a second electrode signal according to various embodiments of the present disclosure. FIG. 13C is a graph showing a channel-specific magnitude of a first electrode signal, and FIG. 13D is a graph showing a channel-specific magnitude of a second electrode signal. As described above, the first electrode signal and the second electrode signal may be distinguished by a method of distinguishing frequencies or times.

As illustrated in FIGS. 13C and 13D, in the current embodiment, a first electrode signal 1305 may be sensed by an electrode of a channel arranged to the left, and a second electrode signal 1306 may be sensed by an electrode of a channel arranged to the right. The profiles 1303 and 1304 illustrated in FIG. 13B may indicate a distribution of the magnitude of a signal sensed by each electrode of the touch sensing device. The touch sensing device, according to various embodiments of the present disclosure, may determine tilt information of the pen 1300 by using relative positions between the profile 1303 of the first electrode signal and the profile 1304 of the second electrode signal. As the pen is tilted more, the distance between the profile 1303 of the first electrode signal and the profile 1304 of the second electrode signal may increase. Thus, the touch sensing device may determine the tilt degree of the pen 1303 based on the distance between the profile 1303 of the first electrode signal and the profile 1304 of the second electrode signal. Meanwhile, the touch sensing device may determine a direction in which the pen 1303 is tilted, according to a direction of the profile 1304 of the second electrode signal with respect to the profile 1304 of the second electrode signal. For example, based on the relative position of the profile 1304 of the second electrode signal in which the profile 1304 is arranged to the right with respect to the profile 1303 of the first electrode signal, the touch sensing device may determine that the pen 1300 is tilted to the right. As described above, the touch sensing device may determine at least one of the tilt direction of the pen 1300 and the tilt degree of the pen 1300. A detailed description will later be made of the determination of the tilt information of the pen 1300 by the touch sensing device.

In the above-described embodiment, the second electrode signal may be generated when the pen pressure is greater than or equal to the threshold value, thus reducing power consumption of the touch sensing device. That is, since a process of generating additional information may require a complex circuit, the second electrode may manage this process and operate only when necessary, such that a driving circuit for driving the first electrode may be implemented with a relatively simple structure and power consumption may be reduced as a whole. Moreover, when the pen approaches the touch sensing device, an additional service such as hovering may be possible in response to the generation of the first electrode signal.

Meanwhile, in another embodiment, the first electrode may generate a signal including additional information. In this case, the touch sensing device may measure additional information and the location using a signal from the first electrode. The second electrode may generate a separate tilt sensing signal for obtaining information about the tilt direction of the pen.

Figure 14A:
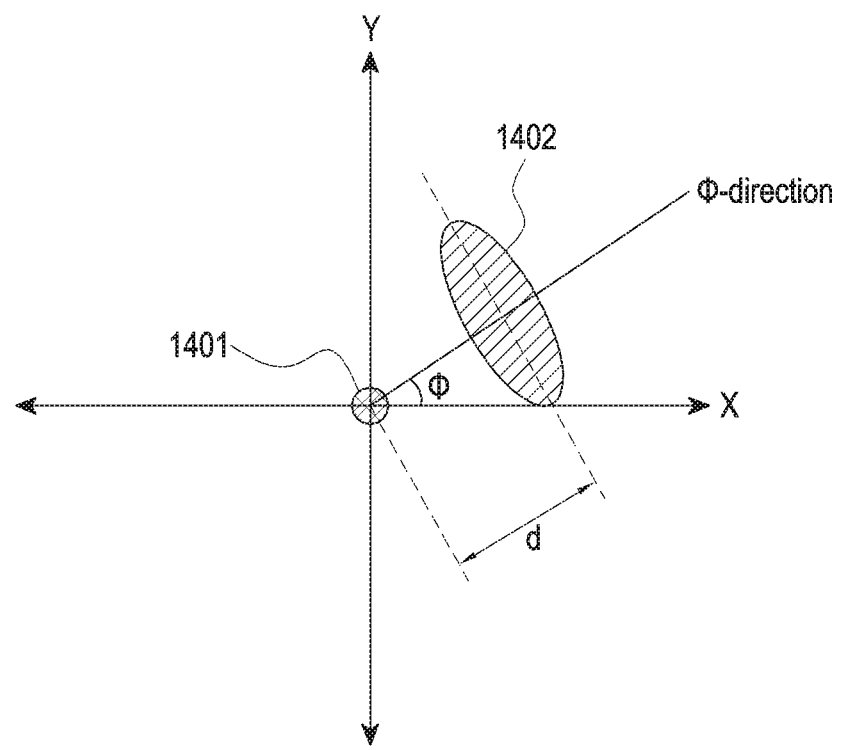
FIGS. 14A through 14C are conceptual views for describing determination of tilt information of a pen by using a profile according to various embodiments of the present disclosure.
Figure 14B:
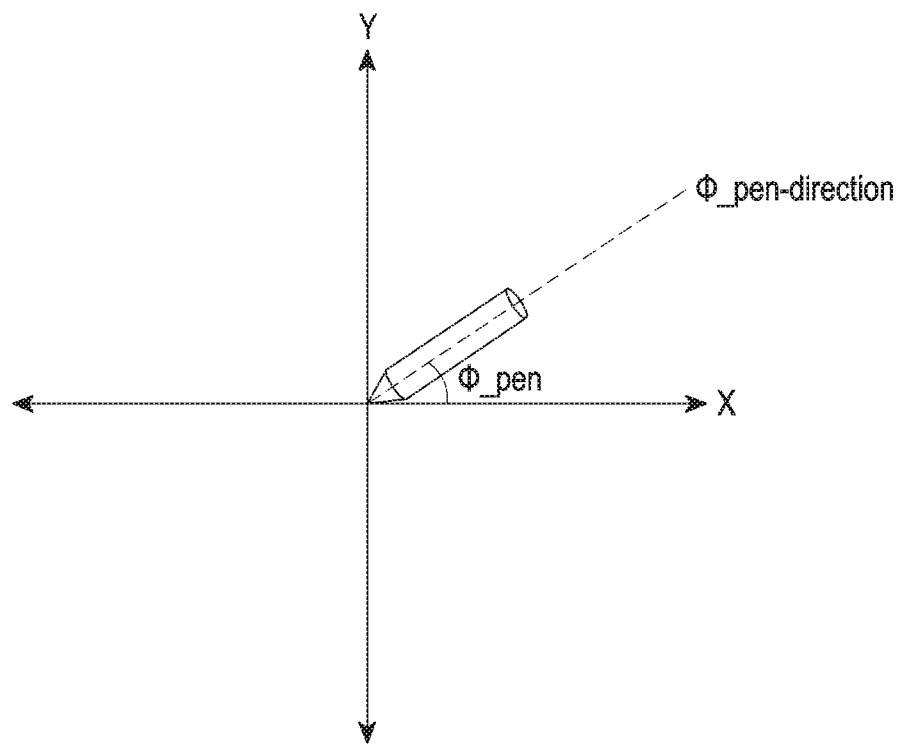
Figure 14C:
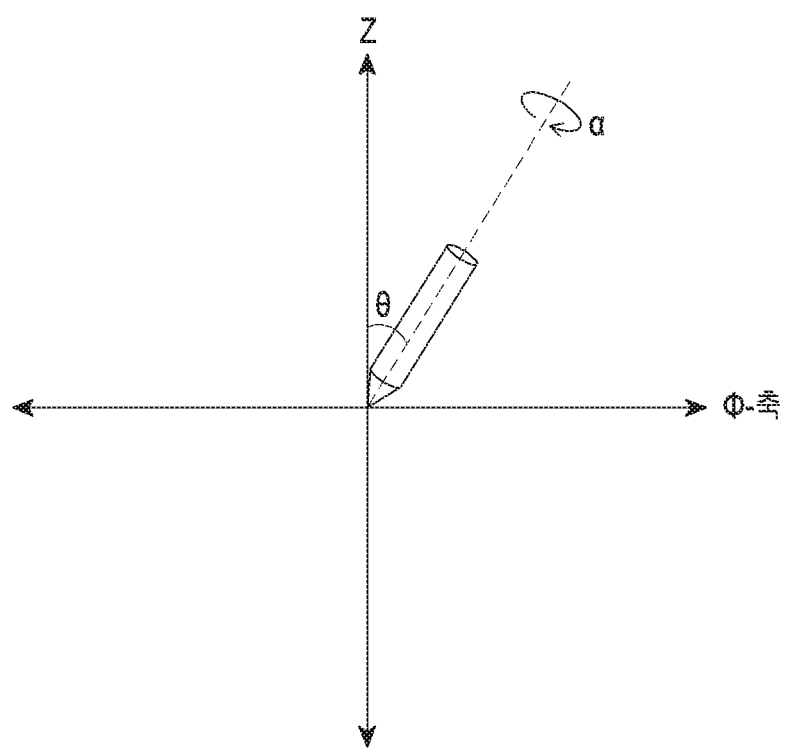

FIGS. 14A through 14C are conceptual views for describing the determination of tilt information of a pen by using a profile according to various embodiments of the present disclosure.

In FIG. 14A, it may be determined that a profile 1401 of a first electrode signal and a profile 1402 of a second electrode signal are separated by d. A φ-direction may be a direction that passes through the center of the profile 1401 of the first electrode signal and the center of the profile 1402 of the second electrode signal. The angle between the φ-direction and an x-axis may be φ. When the second electrode is circularly symmetric, the tilt direction of the pen, φ_pen, may coincide with φ, as illustrated in FIG. 14B.

Thus, the touch sensing device may determine the tilt direction of the pen by measuring the angle φ between the axis passing through the center of the profile 1401 of the first electrode signal and the center of the profile 1402 of the second electrode signal, that is, the φ-direction, and the x-axis.

Meanwhile, the angle θ at which the pen is tilted in FIG. 14C may be determined by the distance (h in FIG. 13A) between the first electrode and the second electrode and the distance d between the center of the profile 1401 of the first electrode signal and the center of the profile 1402 of the second electrode signal.

$$\theta = \sin^{-}(d/h) \qquad \text{Equation 2}$$

The touch sensing device may determine the angle θ at which the pen is tilted by using, for example, Equation (2). As described above, the touch sensing device may determine the direction in and the degree to which the pen is tilted from the angle φ formed between the pen and the x-axis and the angle θ between the pen and the z-axis. That is, the touch sensing device may determine a direction in which the pen is tilted three-dimensionally, by determining the tilt information of the pen based on the two angles φ and θ.

In the current embodiment, in the calculation of d and h, h is illustrated as the difference between the end of the first electrode and the end of the second electrode, but a reference point for determining h may be set variously depending on the structure of an electrode. Likewise, d may also be implemented in various manners such as the distance between locations where the largest signal appears locally, depending on the structure of an electrode and a tilt degree.

Meanwhile, in FIG. 14C, the rotation angle α of the pen is shown. The rotation angle α may mean an angle by which the pen rotates with respect to an axis passing through the center.

FIGS. 15A through 15E are conceptual views for describing a structure for determining the rotation angle of a pen.

Figure 15A:
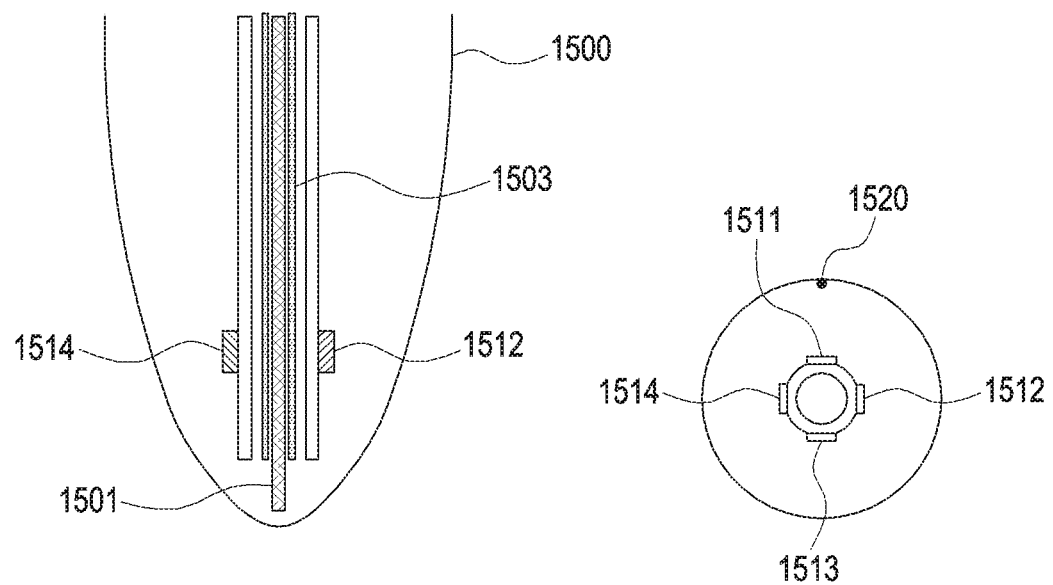
FIGS. 15A through 15E are conceptual views for describing a structure for determining a rotation angle of a pen.

Referring to FIG. 15A, a first electrode 1501 may be arranged in the center of a pen 1500. Second electrodes 1511 through 1514 may be arranged at four quarter points around the center of the pen 1500. The first electrode 1501 may transmit a first electrode signal, and each of the second electrodes 1511 through 1514 may transmit a second electrode signal. Herein, the frequency of the electrode signal transmitted from each of the first and second electrodes 1501 and 1511 through 1514 may differ from signal to signal, such that the electrode signals may be distinguished from one another.

Figure 15B:
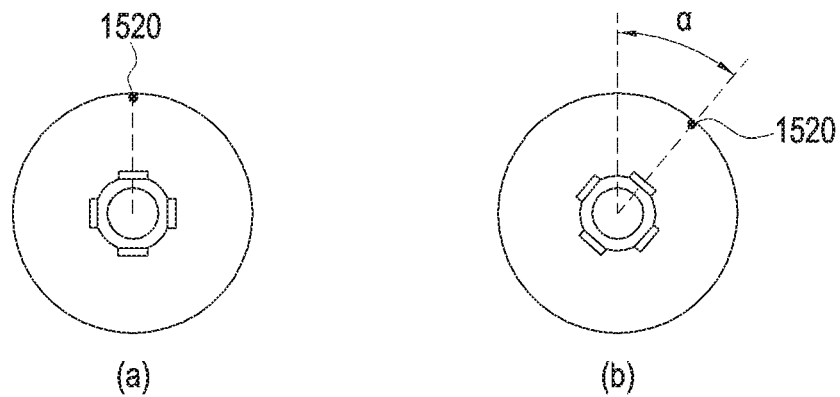
Figure 15C:
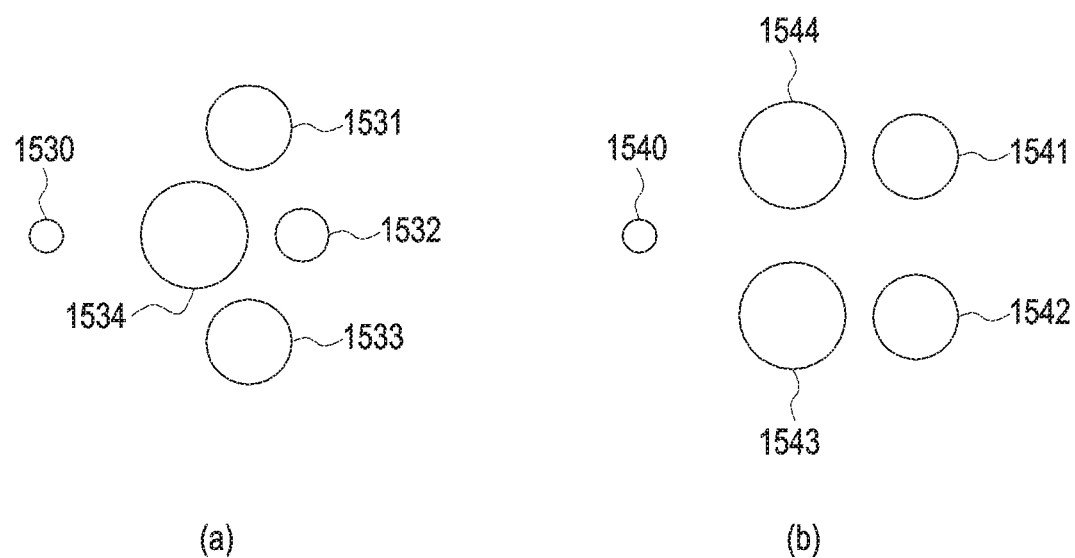

Meanwhile, a reference point 1520 may be defined and may be a point for describing the rotation angle α. As illustrated in FIG. 15B, the pen 1500 may rotate by α. (a) of FIG. 15C illustrates a signal profile prior to the rotation of the pen 1500 in a state where the pen 1500 is tilted in the x-axis direction. Prior to rotation, the touch sensing device may determine that profiles 1531 through 1534 of the second electrode signals are arranged to the left of the center of the profile 1530 of the first electrode signal. As described above, the second electrode signals are distinguished from one another, and thus the profiles 1531 through 1534 of the electrode signals may also be identified. The touch sensing device may determine a rotation angle by detecting a change of the profiles 1531 through 1534 in (a) into profiles 1541 through 1544 in (b). In (a) of FIG. 15C, the profile 1531 of a signal of the second electrode 1511 is in the 12 o'clock direction among the profiles 1531 through 1534. Thus, it can be seen that the second electrode 1511 is located in the 12 o'clock direction. In (b) of FIG. 15C, the profile 1541 of the signal of the second electrode 1511 is in the 10 o'clock direction among the profiles 1541 through 1544. Thus, it can be seen that the second electrode 1511 is located in the 10 o'clock direction. In this way, the touch sensing device may determine the rotation angle of the pen based on a relative position of the profile of the signal. For example, the touch sensing device may set a central point of the profiles 1541 through 1544 and determine the rotation angle of the pen based on a relative position of the profile 1541 with respect to the central point. The pen may set the thickness of handwriting displayed differently according to the rotation angle.

Meanwhile, the foregoing description has been made of a way to sense the rotation angle of the pen from the relative position of the profile of the second electrode signal, but the rotation angle of the pen may also be determined considering one or both of the relative position and relative size.

Figure 15D:
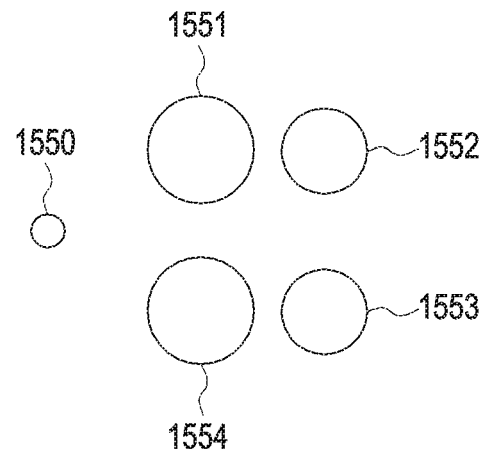
Figure 15D:
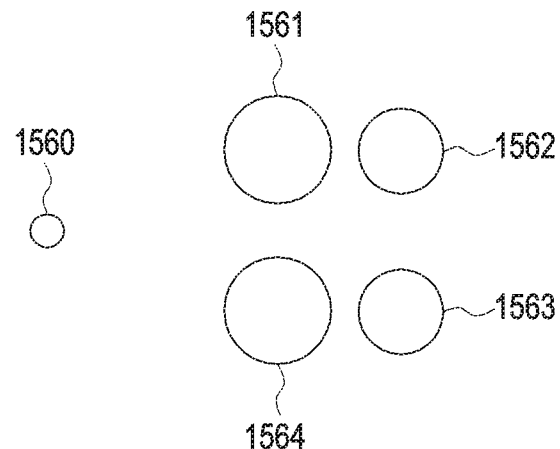
Figure 15E:
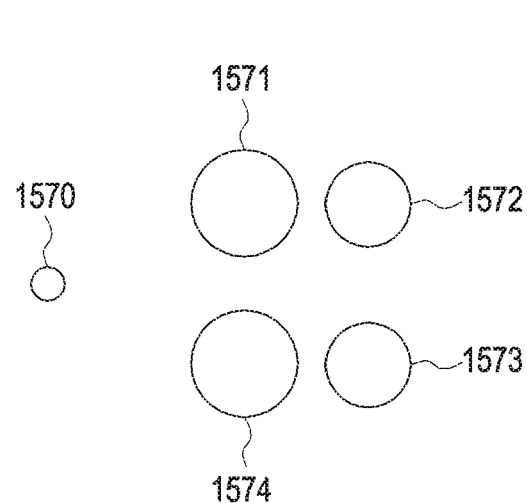
Figure 15E:
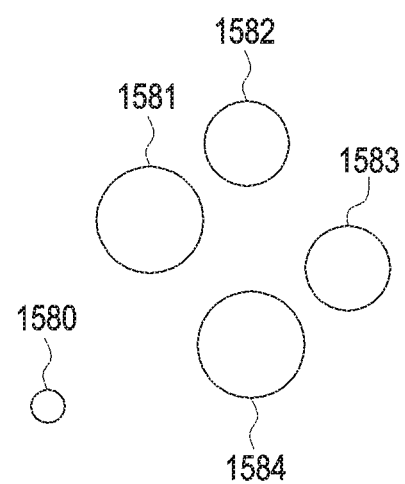

The touch sensing device may determine the tilt information of the pen by using the electrode signal from the pen 1500 having the structure illustrated in FIG. 15A. For example, as illustrated in FIG. 15D, when the pen 1500 is slightly tilted, the distance between a profile 1550 of the first electrode and profiles 1551 through 1554 of the second electrode signals may be relatively short. On the other hand, when the pen 1500 is heavily tilted, the distance between a profile 1560 of the first electrode and profiles 1561 through 1564 of the second electrode signals may be relatively long. The touch sensing device may determine the tilt degree of the pen 1500 based on the distance between the profile of the first electrode signal and the profile of the second electrode signal. Moreover, as illustrated in FIG. 15E, when the pen 1500 is tilted in the x-axis direction, profiles 1571 through 1574 of the second electrode signals are arranged to the right of a profile 1570 of the first electrode signal. Moreover, when the pen 1500 is tilted in the 45-degree direction, the profiles 1571 through 1574 of the second electrode signals are arranged in a 45-degree upward direction with respect to the profile 1570 of the first electrode signal. The touch sensing device may determine the tilt direction of the pen 1500 based on the direction of the profile of the second electrode signal with respect to the profile of the first electrode signal. As described above, in various embodiments of the present disclosure, the frequencies of the second electrode signals transmitted from a plurality of second electrodes of the pen may be different. In another embodiment, the respective second electrode signals may be transmitted after being coded into orthogonal digital codes such as, for example, Hadamard codes.

Figure 16A:
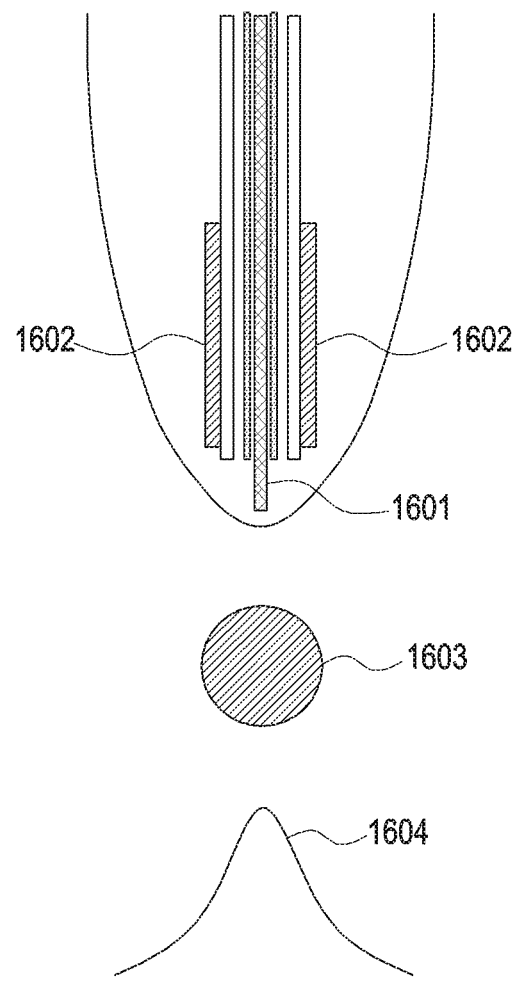
FIGS. 16A and 16B are conceptual views for describing a method for determining tilt information of a pen according to various embodiments of the present disclosure.
Figure 16B:
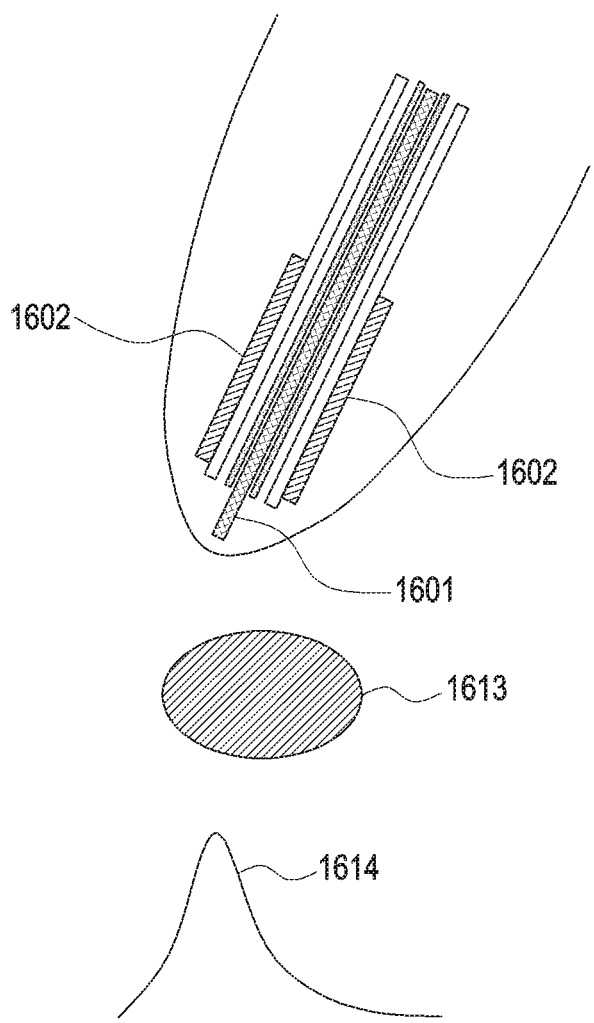

FIGS. 16A and 16B are conceptual views for describing a method for determining tilt information of a pen according to various embodiments of the present disclosure.

Referring to FIG. 16A, a pen 1600 may include a first electrode 1601 and second electrodes 1602. The first electrode 1601 may be arranged in the center of the pen 1600, and the second electrodes 1602 may be arranged physically apart from the first electrode 1601. The first electrode 1601 and the second electrodes 1602 may transmit a first electrode signal and second electrode signals, respectively. In FIG. 16A, a two-dimensional (2D) profile 1603 and a one-dimensional (1D) profile 1604 of the second electrode signals are illustrated. The 2D profile 1603 and the 1D profile 1604 may have symmetric forms when the pen 1600 stands upright in perpendicular to the ground. Meanwhile, as illustrated in FIG. 16B, when the pen 1600 is tilted, a 2D profile 1613 and a 1D profile 1614 of the second electrode signals from the second electrodes 1602 may have asymmetric forms. The touch sensing device may quantify the asymmetric form of the profile, thus determining the tilt degree of the pen. The touch sensing device may also determine the tilt direction of the pen based on a direction in which the 2D profile 1613 has the asymmetric form.

Figure 17A:
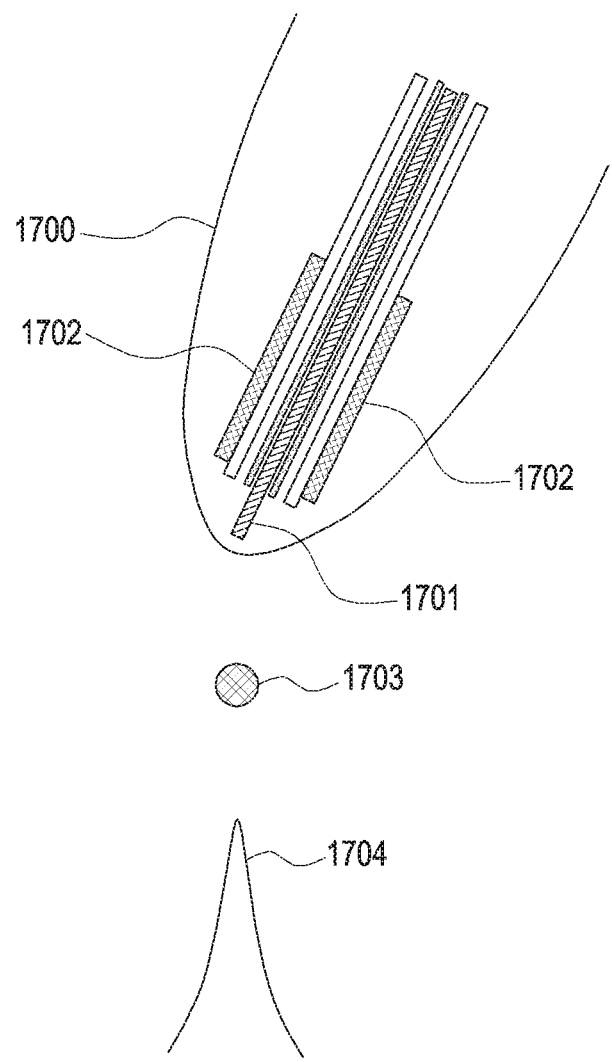
FIGS. 17A to 17C are conceptual views for describing a method for determining tilt information of a pen according to various embodiments of the present disclosure.
Figure 17B:
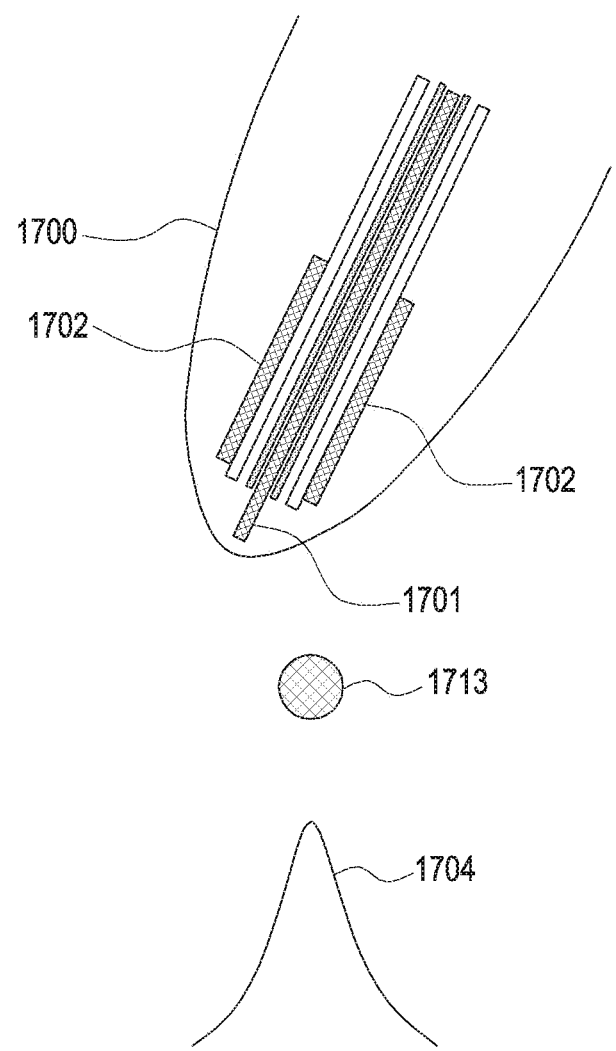
Figure 17C:
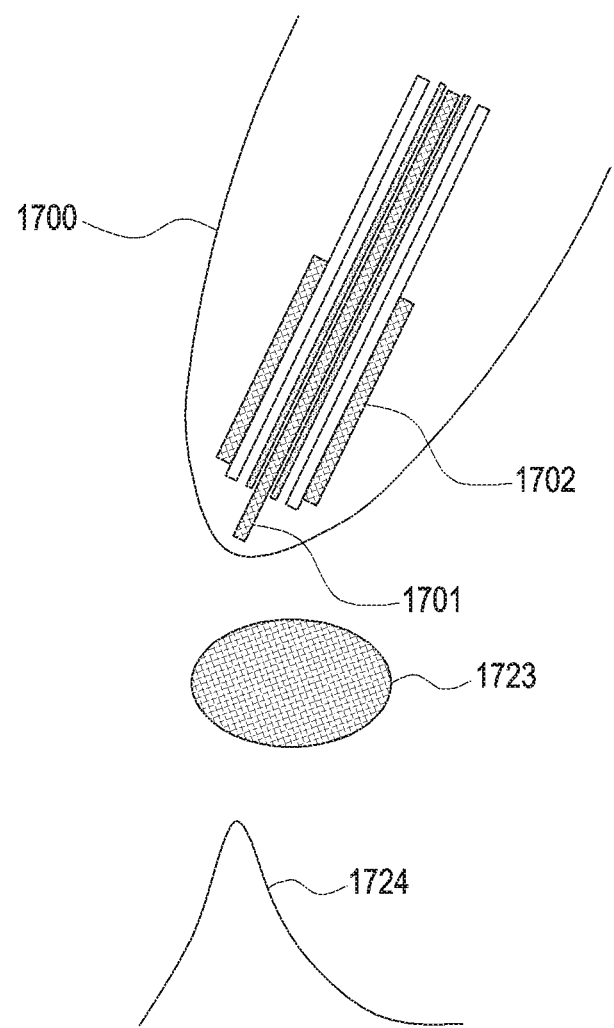

FIGS. 17A to 17C are conceptual views for describing a method for determining tilt information of a pen according to various embodiments of the present disclosure.

A first electrode 1701 may transmit a first electrode signal, and second electrodes 1702 may transmit second electrode signals. The first electrode 1701 may be manufactured in a shape to have a symmetric profile. In particular, the first electrode 1701 may have a small semi-spherical shape to maintain the symmetry of a profile based on the tilt of the pen. Thus, as illustrated in FIG. 17A, a 2D profile 1703 and a 1D profile 1704 of the first electrode signal may have symmetric forms based on the tilt of the pen. Depending on the shape of the pen tip, the profiles 1703 and 1704 of the first electrode signal may be different between a case when the pen is used in a tilted state and a case when the pen is used in an upright state. Such a profile difference may cause a difference in contact position between the two cases. That is, when the difference between an actual position of the pen and a calculated contact position of the pen is minimized for the case where the pen is used in the upright state, the difference between the actual position of the pen and the calculated contact position of the pen may increase due to a profile difference when the pen is used in the tilted state. In this case, the difference between the actual position and the calculated contact position, caused by the profile difference, may be compensated for by calculation of the tilt direction and degree of the pen.

Meanwhile, as illustrated in FIG. 17B, a 2D profile 1713 and a 1D profile 1714 of second electrode signals from the second electrodes 1702 move from positions of the profiles of the first electrode signal as the pen is tilted. Referring to FIG. 17C, the pen may electrically short the first electrode 1701 and the second electrodes 1702, and the touch sensing device may sense an electrode signal from a shorted integrated electrode. A 2D profile 1723 and a 1D profile 1724 of the electrode signal generated from the integrated electrode may have asymmetric forms. The touch sensing device may quantify asymmetric degrees of the 2D profile 1723 and the 1D profile 1724 of the electrode signals generated from the integrated electrode, and determine the tilt degree of the pen based on quantified values. The touch sensing device may quantify asymmetric directions of the 2D profile 1723 and the 1D profile 1724 of the electrode signals generated from the integrated electrode, and determine the tilt direction of the pen based on quantified values. Based on the foregoing description, the first electrode 1701 relatively close to the touch sensing device is included in the integrated electrode, thus forming a stronger capacitive coupling with the touch sensing device than when the second electrode 1702 is used alone. Thus, the touch sensing device may sense an electrode signal having high SNR.

Figure 18:
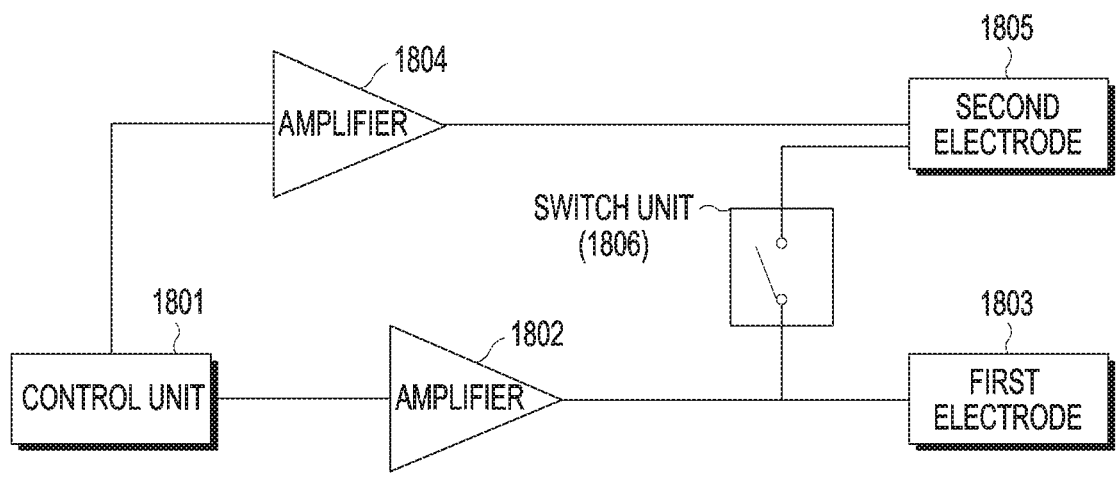
FIG. 18 is a block diagram of a pen according to various embodiments of the present disclosure.

FIG. 18 is a block diagram of a pen according to various embodiments of the present disclosure.

As illustrated in FIG. 18, a pen may include a controller 1801, amplifiers 1802 and 1804, a first electrode 1803, a second electrode 1805, and a switch unit 1806. The controller 1801 may drive the first electrode 1803 or the second electrode 1805 depending on a drive period. In particular, the controller 1801 may short the switch unit 1806 to form an integrated electrode integrating the first electrode 1803 with the second electrode 1805. The amplifiers 1802 and 1804 may amplify an electric signal received from the controller 1801 and transmit the amplified electric signal to the first electrode 1803 and the second electrode 1805.

FIGS. 19A to 19I are conceptual views for describing a method for determining the rotation of a pen according to various embodiments of the present disclosure.

Figure 19A:
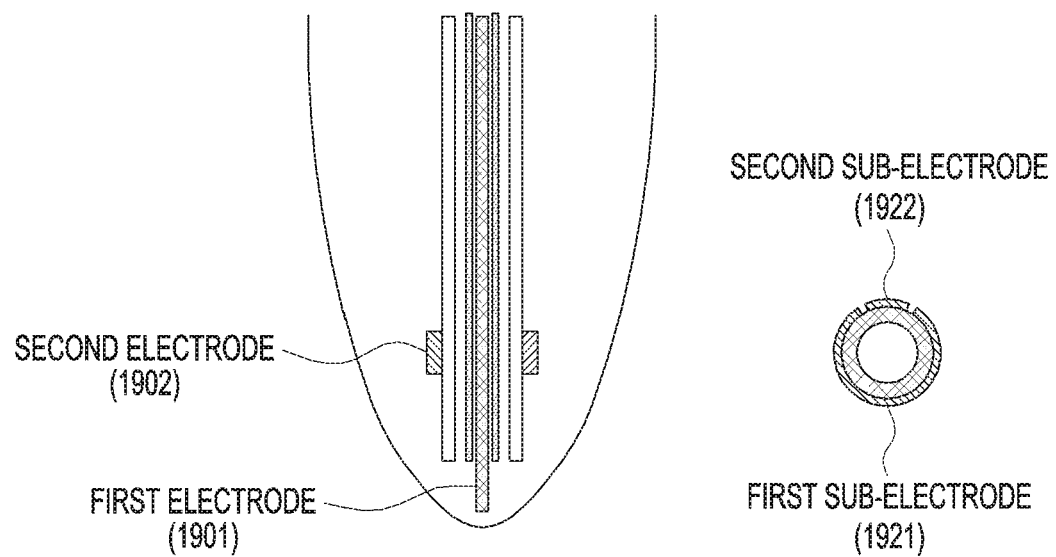
FIGS. 19A to 19I are conceptual views for describing a method for determining rotation of a pen according to various embodiments of the present disclosure.

Referring to FIG. 19A, a first electrode 1901 may be arranged in the center of the pen, and a second electrode 1902 may be arranged apart from the first electrode 1901. The second electrode 1902 may include a first sub-electrode 1921 and a second sub-electrode 1922. The first sub-electrode 1921 and the second sub-electrode 1922 may have different forms.

Figure 19B:
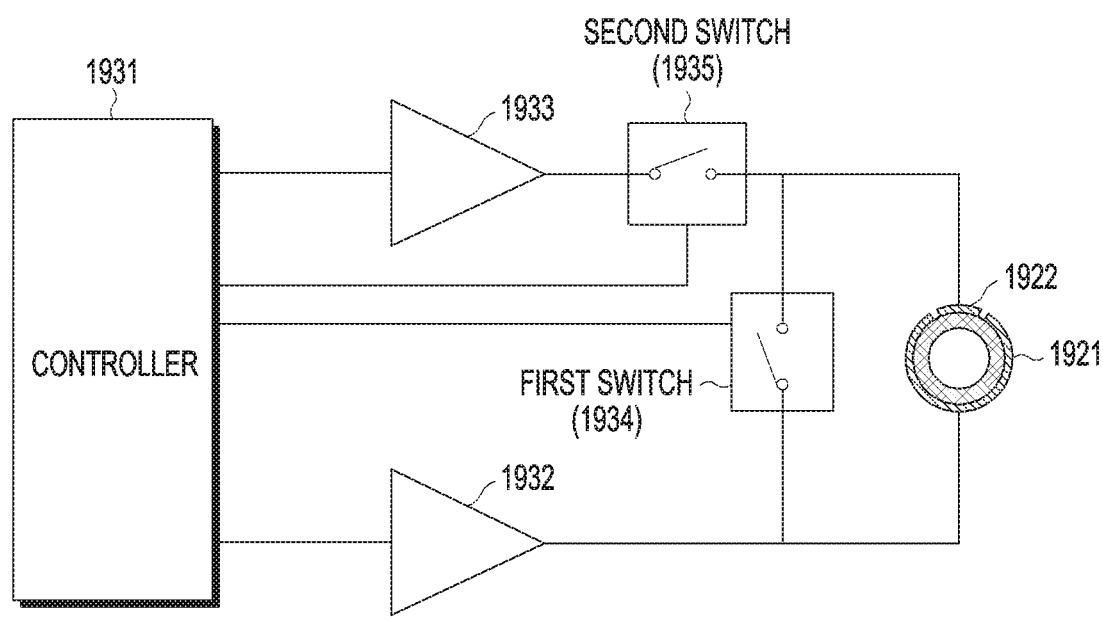

Referring to FIG. 19B, the pen may include a controller 1931, amplifiers 1932 and 1933, a first switch 1934, a second switch 1935, a first sub-electrode 1921, and a second sub-electrode 1922. The second sub-electrode 1922 may have a circular asymmetric form. The controller 1931 may generate an electric signal for generating a second electrode signal. The generated electric signal may be amplified by the first amplifier 1932 and the second amplifier 1933 and delivered to the first sub-electrode 1921 and the second sub-electrode 1922. The controller 1931 may control at least one of the first switch 1934 and the second switch 1934 to short the first sub-electrode 1921 and the second sub-electrode 1922. The controller 1931 may control the second switch 1935 to block the connection between the second amplifier 1933 and the second sub-electrode 1922.

More specifically, during a first drive period, the controller 1931 may short the first switch 1934 to short the first sub-electrode 1921 and the second sub-electrode 1922, thus forming an integrated electrode. The controller 1931 may open the second switch 1935 to block the connection between the second amplifier 1933 and the second sub-electrode 1922. The controller 1931 may output an electric signal for sensing tilt to the first amplifier 1932. The first amplifier 1932 may amplify the input electric signal and output the amplified electric signal to the integrated electrode. The touch sensing device may sense an electrode signal received from the integrated electrode, thus determining the tilt information of the pen.

During a second drive period, the controller 1931 may open the first switch 1934 to electrically separate the first sub-electrode 1921 from the second sub-electrode 1922. The controller 1931 may short the second switch 1935 to connect the second amplifier 1933 with the second sub-electrode 1922. The controller 1931 may generate an electric signal for sensing rotation and output the electric signal to the second amplifier 1933. The second amplifier 1933 may amplify the input electric signal and output the amplified electric signal to the second sub-electrode 1922 which may generate an electrode signal alone.

Figure 19C:
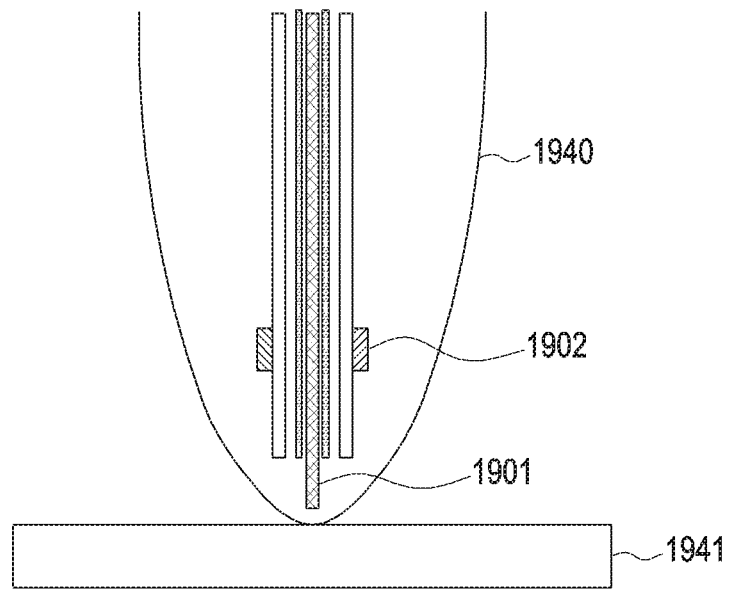
Figure 19D:
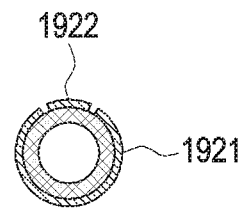
Figure 19E:
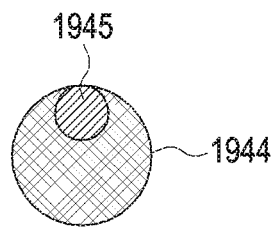
Figure 19F:
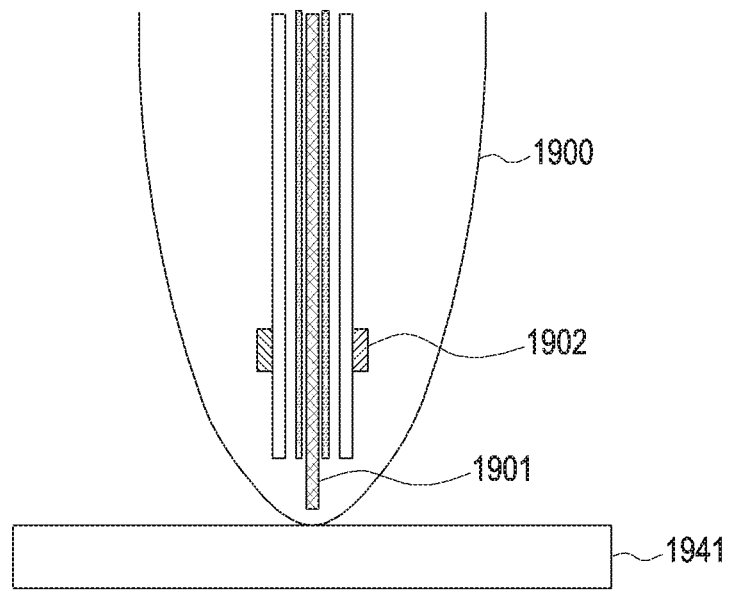
Figure 19G:
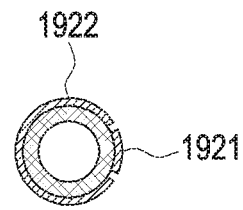
Figure 19H:
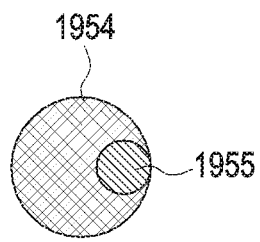

In FIG. 19C, a pen 1900 may contact a touch sensing device 1941 in a way perpendicular to the touch sensing device 1941. In this case, the first sub-electrode 1921 and the second sub-electrode 1922 may be arranged as illustrated in FIG. 19D. The touch sensing device may sense a profile 1944 of the electrode signal from the integrated electrode of the first sub-electrode 1921 and the second sub-electrode 1922 during the first drive period and a profile 1945 of the electrode signal from the second sub-electrode 1922 during the second drive period, as illustrated in FIG. 19E. Meanwhile, as illustrated in FIG. 19F, the pen 1900 contacts perpendicularly to the touch sensing device 1941, but the pen 1900 may rotate as illustrated in FIG. 19G. Thus, the positions of the first sub-electrode 1921 and the second sub-electrode 1922 may be changed. In this case, the touch sensing device may sense a profile 1954 of the electrode signal from the integrated electrode of the first sub-electrode 1921 and the second sub-electrode 1922 during the first drive period and a profile 1955 of the electrode signal from the second sub-electrode 1922 during the second drive period, as illustrated in FIG. 19H. The touch sensing device may determine the rotation of the pen based on a change in the profile. For example, the touch sensing device may determine the rotation angle of the pen based on the direction of the profile 1945 or 1954 during the second drive period in the profile 1944 or 1955 during the first drive period.

Figure 19I:
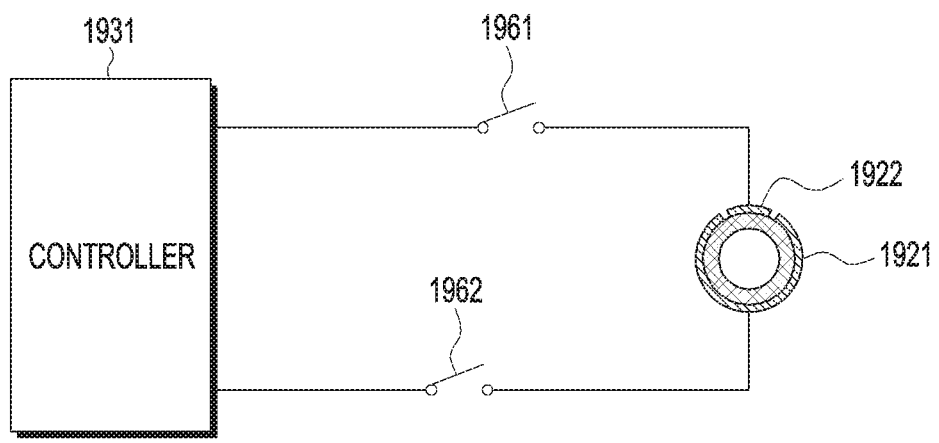

FIG. 19I is a block diagram illustrating a pen according to another embodiment. The pen, according to another embodiment, may include switches 1961 and 1962 connected to the controller 1931, and the first sub-electrode 1921, and the second sub-electrode 1922. For example, during the first drive period, the controller 1931 may short both the first switch 1961 and the second switch 1962 to transmit electrode signals from both the first sub-electrode 1921 and the second sub-electrode 1922. During the second drive period, the controller 1931 may short both the first switch 1961 and open the second switch 1962 to transmit an electrode signal only from the second sub-electrode 1922. Thus, the touch sensing device may sense a profile of the electrode signals from the first sub-electrode 1921 and the second sub-electrode 1922 during the first drive period and a profile of the electrode signal from the second sub-electrode during the second drive period, thus determining the rotation information of the pen based on a change in the profiles.

Figure 20A:
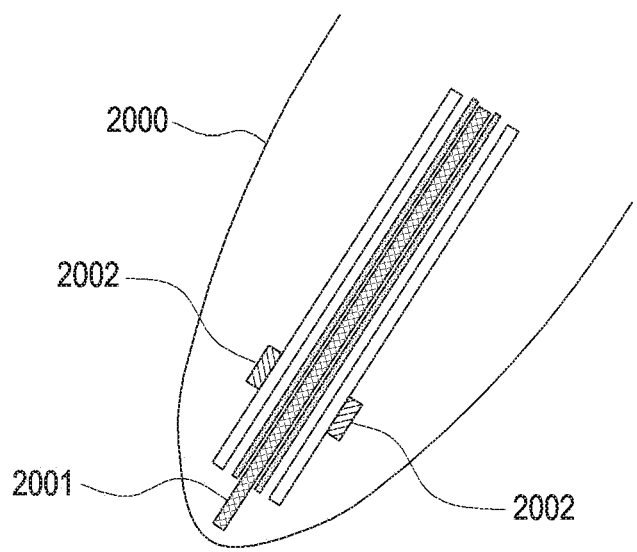
FIGS. 20A to 20C are conceptual views for describing a method for determining tilt information of a pen and rotation information of the pen according to various embodiments of the present disclosure.
Figure 20B:
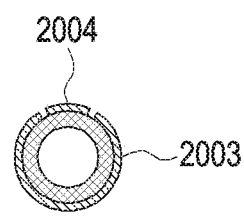
Figure 20C:
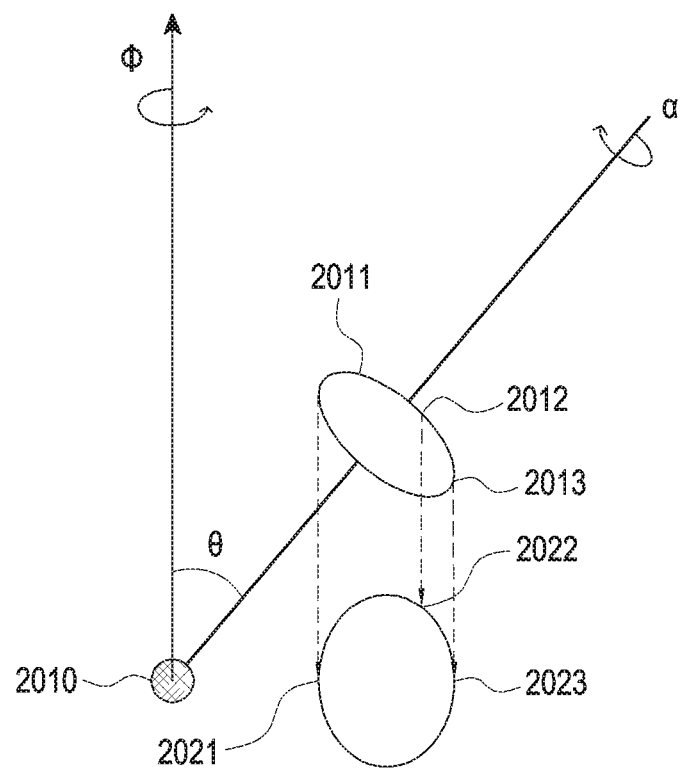

FIGS. 20A to 20C are conceptual views for describing a method for determining tilt information of a pen and rotation information of the pen according to various embodiments of the present disclosure.

Referring to FIG. 20A, a pen 2000 may include a first electrode 2001 and second electrodes 2002. Based on the foregoing description, the touch sensing device may determine the tilt direction and angle of the pen based on the asymmetry of a profile of an electrode signal received from the first electrode 2001, the second electrode 2002, or an integrated electrode of the first electrode 2001 and the second electrode 2002. The second electrode 2002 may include a first sub-electrode 2003 and a second sub-electrode 2004. The first sub-electrode 2003 and the second sub-electrode 2004 may be electrically insulated from each other. When the first sub-electrode 2003 and the second sub-electrode 2004 are driven at the same time, the integrated electrode integrating the first sub-electrode 2003 with the second sub-electrode 2004 may have a circular symmetric shape. However, the shape of the second sub-electrode 2004 alone may have a circular asymmetric form.

In FIG. 20C are illustrated a 2D profile 2010 of an electrode signal from the first electrode 2001, the trajectory of signals 2011 through 2013 from the second sub-electrode 2004 based on the rotation of the pen 2000, and the trajectory of electrode signals 2021 through 2023 from the second sub-electrode 2004 based on the rotation of the pen 2000.

The touch sensing device may determine the contact position of the pen from a 2D profile of the electrode signal from the first electrode 2001. The touch sensing device may determine tilt direction $\varphi$ and tilt angle $\theta$ of the pen 2000 from the profiles of the first electrode signal and the second electrode signal. Once the contact position of the pen 2000 and the tilt direction $\varphi$ and tilt angle $\theta$ of the pen 2000 are determined, the position of the second sub-electrode 2004 may be calculated based on positions of the electrode signals 2021 through 2023 sensed from the second sub-electrode 2004. That is, when the electrode signal generated from the second sub-electrode 2004 is in the position of the electrode signal 2021, the second sub-electrode 2004 may be in the position of the signal 2011, and likewise, when the electrode signal generated from the second sub-electrode 2004 is in the position of the electrode signal 2022, the second sub-electrode 2004 may be in the position of the signal 2012. Thus, the touch sensing device may determine the rotation angle of the pen based on the 2D profile of the electrode signal from the first electrode 2001, the tilt direction φ and tilt angle θ of the pen, and the sensed position of the electrode signal from the second sub-electrode 2004.

Figure 21:
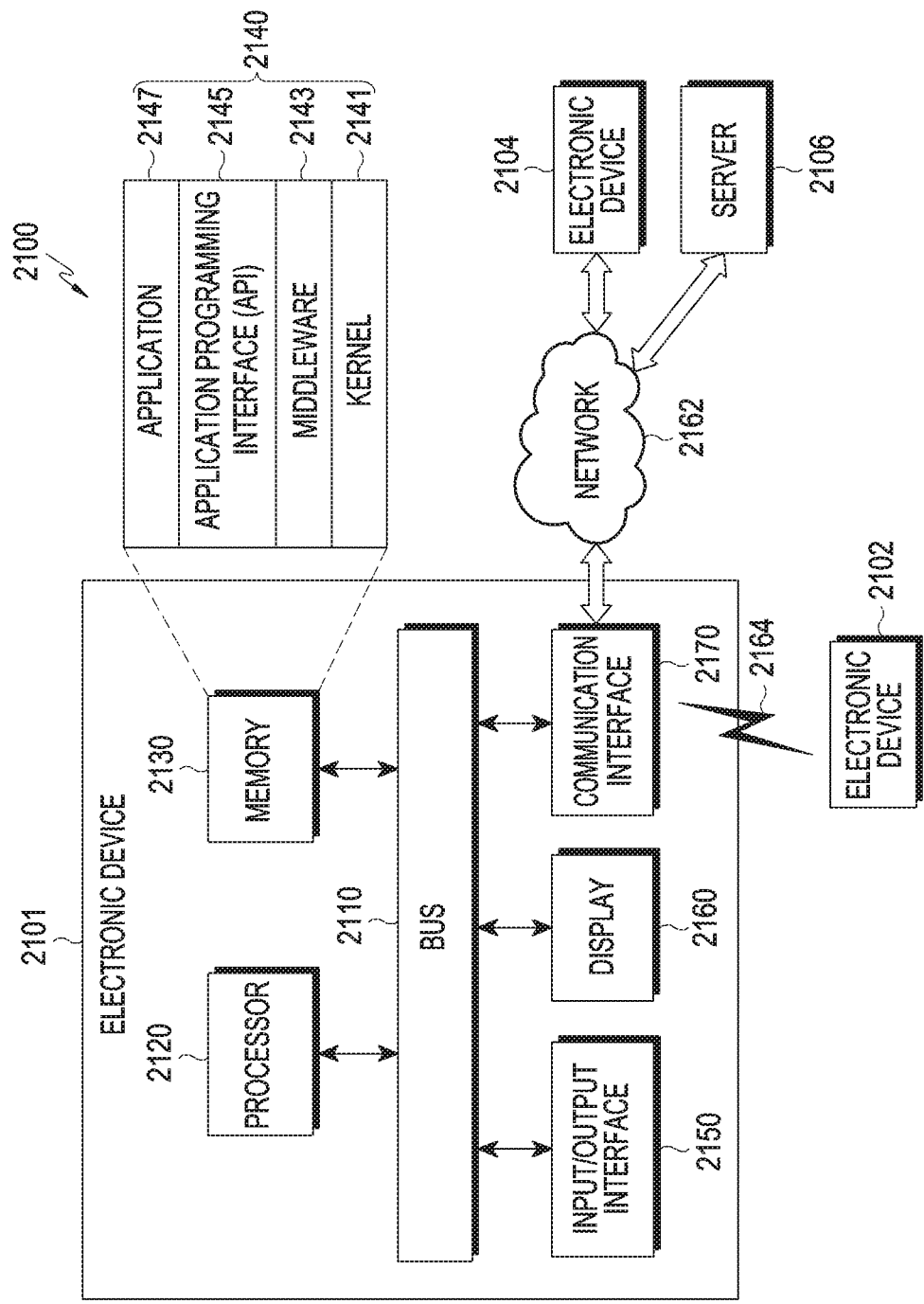
FIG. 21 is a block diagram of a touch sensing device and a network according to various embodiments of the present disclosure.

Referring to FIG. 21, a touch sensing device 2101 in a network environment 2100 according to various embodiments is disclosed. The touch sensing device 2101 may include a bus 2110, a processor 2120, a memory 2130, an input/output (I/O) interface 2150, a display 2160, and a communication interface 2170. According to some embodiments, the touch sensing device 2101 may omit at least one of the foregoing elements or may further include other elements. The bus 2110 may include a circuit for connecting, e.g., the elements 2110 to 2170 and delivering communication (e.g., a control message or data) between the elements 110 to 170. The processor 2120 may include one or more of a central processing unit (CPU), an application processor (AP), and a communication processor (CP). The processor 2120 performs operations or data processing for control and/or communication of, for example, at least one other elements of the touch sensing device 2101.

The memory 2130 may include a volatile and/or nonvolatile memory. The memory 2130 may store, for example, instructions or data associated with at least one other elements of the touch sensing device 2101. According to an embodiment, the memory 2130 may store software and/or a program 2140. The program 2140 may include at least one of, for example, a kernel 2141, middleware 2143, an application programming interface (API) 2145, and/or an application program (or "application") 2147, and the like. At least some of the kernel 2141, the middleware 2143, and the API 2145 may be referred to as an operating system (OS). The kernel 2141 may control or manage, for example, system resources (e.g., the bus 2110, the processor 2120, the memory 2130, etc.) used to execute operations or functions implemented in other programs (e.g., the middleware 2143, the API 2145, or the application program 2147). The kernel 2141 provides an interface through which the middleware 2143, the API 2145, or the application program 2147 accesses separate components of the touch sensing device 2101 to control or manage the system resources.

The middleware 2143 may work as an intermediary for allowing, for example, the API 2145 or the application program 2147 to exchange data in communication with the kernel 2141. In addition, the middleware 2143 may process one or more task requests received from the application program 2147 based on priorities. For example, the middleware 2143 may give a priority for using a system resource (e.g., the bus 2110, the processor 2120, the memory 2130, etc.) of the touch sensing device 2101 to at least one of the application programs 2147, and may process the one or more task requests. The API 2145 is an interface used for the application 2147 to control a function provided by the kernel 2141 or the middleware 2143, and may include, for example, at least one interface or function (e.g., an instruction) for file control, window control, image processing or character control. The I/O interface 2150 may deliver, for example, an instruction or data input from a user or another external device to other component(s) of the touch sensing device 2101, or output an instruction or data received from other component(s) of the touch sensing device 2101 to a user or another external device.

The display 2160 may include, for example, a liquid crystal display (LCD), a light emitting diode (LED) display, an organic light emitting diode (OLED) display, a microelectromechanical system (MEMS) display, or an electronic paper display. The display 2160 may, for example, display various contents (e.g., a text, an image, video, an icon, and/or a symbol, etc.) to users. The display 2160 may include a touch screen, and receives a touch, a gesture, proximity, or a hovering input, for example, by using an electronic pen or a part of a body of a user. The communication interface 2170 establishes communication between the touch sensing device 2101 and an external device (e.g., a first external touch sensing device 2102, a second external touch sensing device 2104, or a server 2106). For example, the communication interface 2170 may be connected to a network 2162 through wireless communication or wired communication to communicate with an external device (e.g., the second external touch sensing device 2104 or the server 2106).

The wireless communication may include cellular communication using at least one of Long-Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include GNSS. The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of universal serial bus (USB), high definition multimedia interface (HDMI), recommended standard 232 (RS-232), power line communication, and plain old telephone service (POTS). The network 2162 may include a telecommunications network, for example, at least one of a computer network (e.g., a local area network (LAN) or a wide area network (WAN)), Internet, and a telephone network.

Each of the first external touch sensing device 2102 and the second external touch sensing device 2104 may be a device of the same type as or a different type than the touch sensing device 2101. According to various embodiments, some or all of operations performed by the touch sensing device 2101 may be performed in another touch sensing device or a plurality of touch sensing devices (e.g., the touch sensing device 2102, 2104 or the server 2106). According to an embodiment of the present disclosure, when the touch sensing device 2101 has to perform a function or a service automatically or at a request, the touch sensing device 2101 may request another device (e.g., the touch sensing devices 2102 or 2104 or the server 2106) to perform at least some functions associated with the function or the service instead of or in addition to executing the function or the service. The another touch sensing device (e.g., the touch sensing device 2102 or 2104 or the server 2106) may execute the requested function or additional function and deliver the execution result to the touch sensing device 2101. The touch sensing device 2101 may then process or further process the received result to provide the requested function or service. To that end, a cloud computing, distributed computing, or client-server computing technology may be used, for example.

Figure 22:
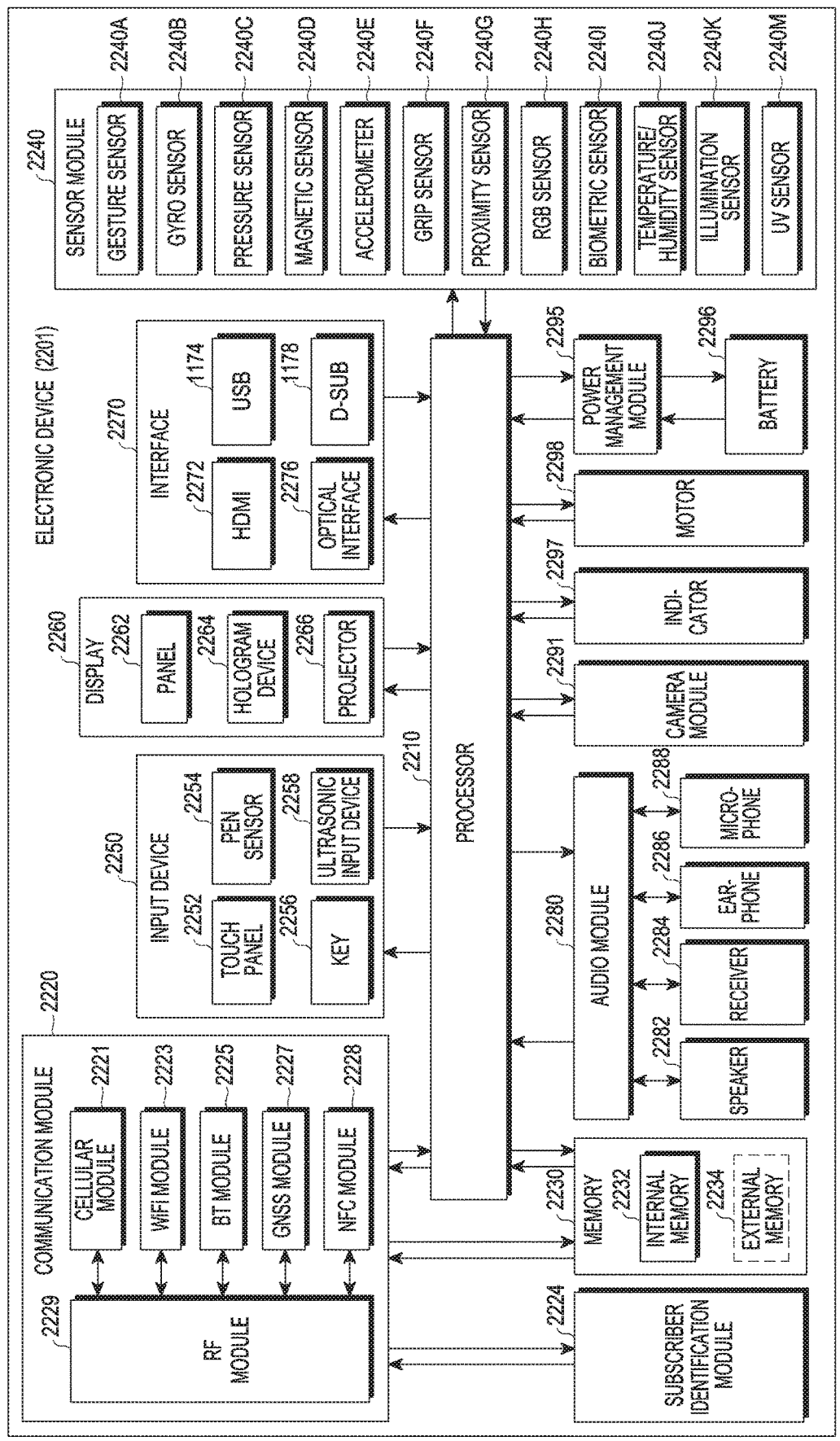
FIG. 22 is a block diagram of a touch sensing device according to various embodiments.

FIG. 22 is a block diagram of a touch sensing device 2301 according to various embodiments. The touch sensing device 2301 may form the entire touch sensing device 2101 illustrated in FIG. 21 or a part of the touch sensing device 101 illustrated in FIG. 1. The touch sensing device 2301 may include one or more processors (e.g., application processors (APs)) 2310, a communication module 2320, a subscriber identification module (SIM) 2324, a memory 2330, a sensor module 2340, an input device 2350, a display 2360, an interface 2370, an audio module 2380, a camera module 2391, a power management module 2395, a battery 2396, an indicator 2397, and a motor 2398. The processor 2310 may control multiple hardware or software components connected to the processor 2310 by driving an OS or an application program, and perform processing and operations with respect to various data. The processor 2310 may be implemented with, for example, a system on chip (SoC). According to an embodiment of the present disclosure, the server 2310 may include a GPU and/or an image signal processor. The processor 2310 may include at least some of the elements illustrated in FIG. 22 (e.g., the cellular module 2321). The processor 2310 loads an instruction or data received from at least one of other elements (e.g., a non-volatile memory) into a volatile memory to process the instruction or data, and stores result data in the non-volatile memory.

The communication module 2320 may have a configuration that is the same as or similar to the communication interface 2170. The communication module 2320 may include, for example, the cellular module 2321, a WiFi module 2323, a Bluetooth (BT) module 2325, a GNSS module 2327, a near field communication (NFC) module 2328, and a radio frequency (RF) module 2329. The cellular module 2321 may provide, for example, a voice call, a video call, a text service, or an Internet service over a communication network. According to an embodiment, the cellular module 2321 identifies and authenticates the touch sensing device 2301 in a communication network by using the SIM 2324 (e.g., a SIM card). According to an embodiment, the cellular module 2321 may perform at least one of functions that may be provided by the processor 2310. According to an embodiment, the cellular module 2321 may include a communication processor (CP). According to some embodiment, at least some (e.g., two or more) of the cellular module 2321, the WiFi module 2323, the BT module 2325, the GNSS module 2327, and the NFC module 2328 may be included in one integrated chip (IC) or IC package. The RF module 2329 may, for example, transmit and receive a communication signal (e.g., an RF signal). The RF module 2329 may include a transceiver, a power amp module (PAM), a frequency filter, a low noise amplifier (LNA), or an antenna. According to another embodiment, at least one of the cellular module 2321, the WiFi module 2323, the BT module 2325, the GNSS module 2327, and the NFC module 2328 may transmit and receive an RF signal through the separate RF module. The SIM 2324 may, for example, include a card including a SIM or an embedded SIM, and may include unique identification information (e.g., an integrated circuit card identifier (ICCID) or subscriber information (e.g., an international mobile subscriber identity (IMSI)).

The memory 2330 (e.g., the memory 2130) may, for example, include an internal memory 2332 and/or an external memory 2334. The internal memory 2332 may, for example, include at least one of a volatile memory (e.g., dynamic random-access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid-state drive (SSD). The external memory 2334 may further include flash drive, for example, compact flash (CF), secure digital (SD), micro-SD, mini-SD, extreme Digital (xD), a multi-media card (MMC), or a memory stick. The external memory 2334 may be functionally or physically connected with the touch sensing device 2301 through various interfaces.

The sensor module 2340 measures physical quantity or senses an operation state of the touch sensing device 2301 to convert the measured or sensed information into an electric signal. The sensor module 2340 may, for example, include at least one of a gesture sensor 2340A, a gyro sensor 2340B, a pressure sensor 2340C, a magnetic sensor 2340D, an acceleration sensor 2340E, a grip sensor 2340F, a proximity sensor 2340G, a color sensor 2340H (e.g., RGB sensor), a biometric sensor 2340I, a temperature/humidity sensor 2340J, an illumination sensor 2340K, and a ultraviolet (UV) sensor 2340M. Additionally or alternatively, the sensor module 2340 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 2340 may further include a control circuit for controlling at least one sensor included therein. In an embodiment, the touch sensing device 2301 may further include a processor configured to control the sensor module 2340 as part of or separately from the processor 2310, to control the sensor module 2340 during a sleep state of the processor 2310.

The input device 2350 may include, for example, a touch panel 2352, a (digital) pen sensor 2354, a key 2356, or an ultrasonic input device 2358. The touch panel 2352 may use at least one of a capacitive type, a resistive type, an IR type, or an ultrasonic type. The touch panel 2352 may further include a control circuit. The touch panel 2352 may further include a tactile layer to provide tactile reaction to the user. The (digital) pen sensor 2354 may include a recognition sheet which is a part of the touch panel 252 or a separate recognition sheet. The key 2356 may also include a physical button, an optical key, or a keypad. The ultrasonic input device 2358 senses ultrasonic waves generated by an input means through a microphone (e.g., the microphone 2388) and checks data corresponding to the sensed ultrasonic waves.

The display 2360 (e.g., the display 2160) may include a panel 2362, a hologram device 2364, a projector 2366, and/or a control circuit for controlling them. The panel 2362 may be implemented to be flexible, transparent, or wearable. The panel 2362 may be configured with the touch panel 2352 in one module. According to an embodiment, the panel 2362 may include a pressure sensor (or a "force sensor", interchangeably used hereinafter) capable of measuring a strength of a pressure by a user's touch. The pressure sensor may be implemented integrally with the touch panel 2352 or may be implemented as one or more sensors separate from the touch panel 2352. The hologram device 2364 may show a stereoscopic image in the air by using interference of light.

The projector 2366 may display an image onto a screen through projection of light. The screen may be positioned inside or outside the touch sensing device 2301. The interface 2370 may include an HDMI 2372, a universal serial bus (USB) 2374, an optical communication 2376, or a D-sub-miniature 2378. The interface 2370 may be included in the communication interface 2170 illustrated in FIG. 21. Additionally or alternatively, the interface 2370 may include, for example, a mobile high-definition link (MHL) interface, an SD card/MMC interface, or an infrared data association (IrDA) interface.

The audio module 2380 may bi-directionally convert sound and an electric signal. At least one element of the audio module 2380 may be included in the I/O interface 2145 illustrated in FIG. 21. The audio module 2380 may process sound information input or output through the speaker 2382, the receiver 2384, the earphone 2386, or the microphone 2388. The camera module 2391 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 2395 manages power of the touch sensing device 2301. According to an embodiment, the power management module 2395 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 2396 or the voltage, current, or temperature of the battery 296 during charging. The battery 2396 may include, for example, a rechargeable battery and/or a solar battery.

The indicator 2397 displays a particular state, for example, a booting state, a message state, or a charging state, of the touch sensing device 2301 or a part thereof (e.g., the processor 2310). The motor 2398 may convert an electric signal into mechanical vibration or generates vibration or a haptic effect. The touch sensing device 2301 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the touch sensing device. In various embodiments, some components of the touch sensing device (e.g., the touch sensing device 2301) may be omitted or may further include other elements, and some of the components may be coupled to form one entity and identically perform functions of the components before being coupled.

Figure 23:
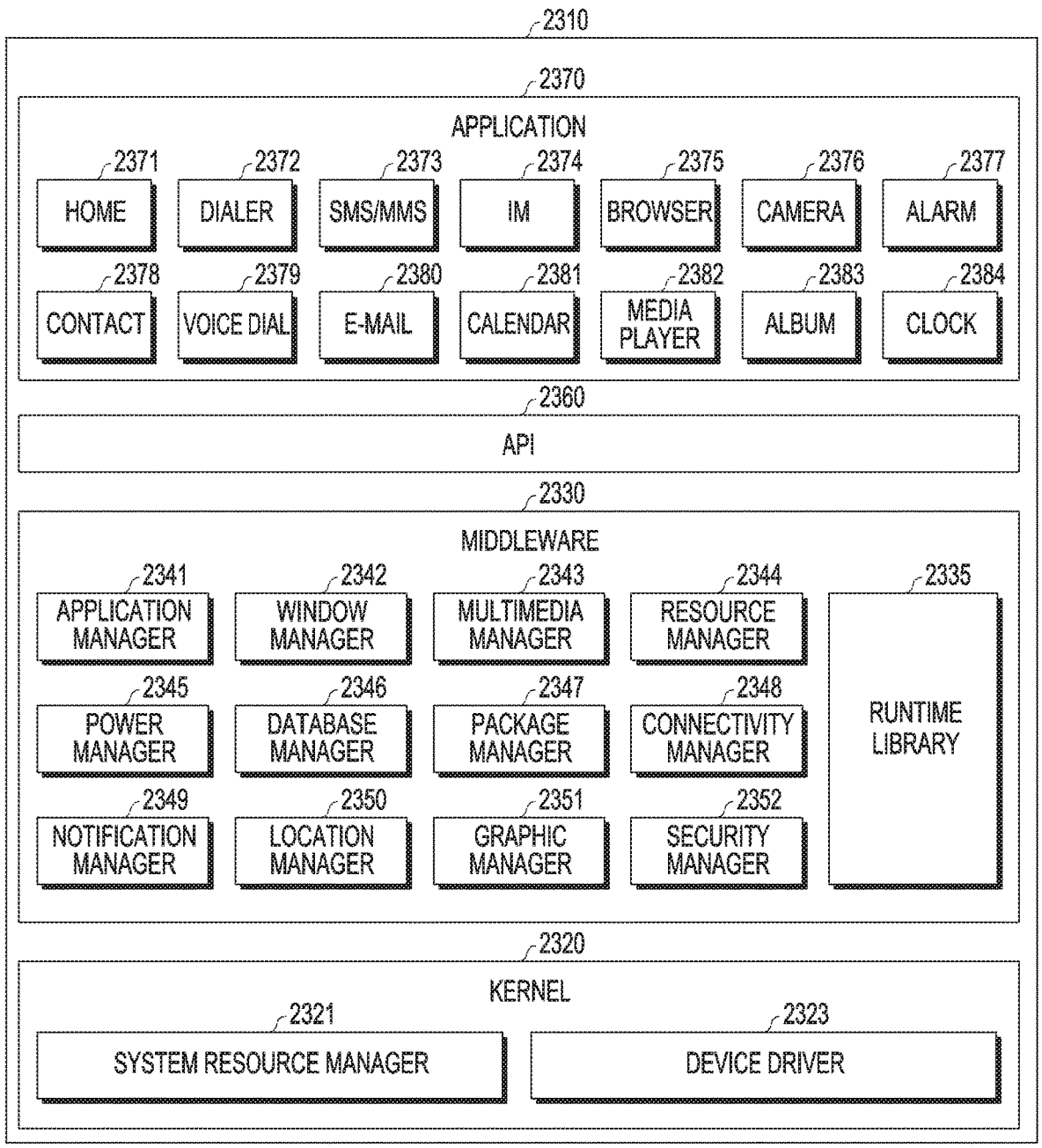
FIG. 23 is a block diagram of a programming module according to various embodiments.

FIG. 23 is a block diagram of a programming module according to various embodiments. According to an embodiment, a programming module 2310 (e.g., the program 2140) may include an OS for controlling resources associated with a touch sensing device (e.g., the touch sensing device 2101) and/or various applications (e.g., the application program 2147) executed on the OS. The OS may include Android™, iOS™, Windows™, Symbian™, Tizen™, or Bada™. Referring to FIG. 23, the programming module 2310 may include a kernel 2320 (e.g., the kernel 2141), middleware 2330 (e.g., the middleware 2143), an application programming interface (API) 2360 (e.g., the API 2145), and/or an application 2370 (e.g., the application program 2147). At least a part of the programming module 2310 may be preloaded on a touch sensing device or may be downloaded from an external device (e.g., the touch sensing device 2102 or 2104, or the server 2106).

The kernel 2320 may include a system resource manager 2321 and/or a device driver 2323. The system resource manager 2321 may perform control, allocation, retrieval of system resources, and so forth. According to an embodiment, the system resource manager 2321 may include a process management unit, a memory management unit, or a file system management unit. The device driver 2323 may include, for example, a display driver, a camera driver, a Bluetooth driver, a shared memory driver, a USB driver, a keypad driver, a WiFi driver, an audio driver, or an inter-process communication (IPC) driver. The middleware 2330 may include provide functions that the application 2370 commonly requires or provide various functions to the application 2370 through the API 2360 to allow the application 2370 to use a limited system resource in a touch sensing device. According to an embodiment, the middleware 2330 may include at least one of a runtime library 2335, an application manager 2341, a window manager 2342, a multimedia manager 2343, a resource manager 2344, a power manager 2345, a database manager 2346, a package manager 2347, a connectivity manager 2348, a notification manager 2349, a location manager 2350, a graphic manager 2351, and a security manager 2352.

The runtime library 2335 may include a library module that a compiler uses to add a new function through a programming language while the application 2370 is executed. The runtime library 2335 performs input/output management, memory management, or calculation function processing. The application manager 2341 manages a life cycle of the applications 2370. The window manager 2342 manages a graphic user interface (GUI) resource used in a screen. The multimedia manager 2343 recognizes a format necessary for playing media files and performs encoding or decoding on a media file by using a codec appropriate for a corresponding format. The resource manager 2344 manages a source code or a memory space of the applications 2370. The power manager 2345 manages a battery or power and provides power information necessary for an operation of the touch sensing device. According to an embodiment, the power manager 2345 may operate with basic input/output system (BIOS). The database manager 2346 generates, searches or changes a database used for at least one application among the applications 2370. The package manager 2347 manages the installation or update of an application distributed in a package file format.

The connectivity manager 2348 manages a wireless connection. The notification manager 2349 provides an event, e.g., an arriving message, an appointment, proximity notification, etc. The location manager 2350 manages location information of the touch sensing device. The graphic manager 2351 manages, for example, a graphic effect to be provided to a user or a user interface relating thereto. The security manager 2352 provides, for example, system security or user authentication. According to an embodiment, the middleware 2330 may further include a telephony manager for managing a voice or video call function of the touch sensing device or a middleware module forming a combination of functions of the above-described components. According to an embodiment, the middleware 2330 provides a module specified for each type of an OS. Additionally, the middleware 2330 may delete some of existing elements or add new elements dynamically. The API 2360 may be provided as a set of API programming functions with a different configuration according to the OS. In the case of Android or iOS, for example, one API set may be provided by each platform, and in the case of Tizen, two or more API sets may be provided.

The application 2370 may include one or more applications capable of providing a function, for example, a home application 2371, a dialer application 2372, a short messaging service/multimedia messaging service (SMS/MMS) application 2373, an instant message (IM) application 2374, a browser application 2375, a camera application 2376, an alarm application 2377, a contact application 2378, a voice dial application 2379, an e-mail application 2380, a calendar application 2381, a media player application 2382, an album application 2383, a clock application 2384, a health care application (e.g., an application for measuring an exercise amount, a blood sugar, etc.), or an environment information providing application (e.g., an application for providing air pressure, humidity, or temperature information or the like). According to an embodiment, the application 2370 may include an information exchange application supporting information exchange between the touch sensing device and an external touch sensing device. The information exchange application may include, for example, a notification relay application for transferring specific information to the external touch sensing device or a device management application for managing the external touch sensing device. For example, the notification relay application may deliver notification information generated in another application of the touch sensing device to an external touch sensing device or may receive notification information from the external touch sensing device and provide the notification information to the user. The device management application may manage (e.g., install, remove, or update) a function (e.g., turn on/turn off of an external touch sensing device itself (or a part thereof) or control of brightness (or resolution) of a display) of an external device communicating with the touch sensing device, a service provided by an application operating in an external touch sensing device or provided by the external touch sensing device (e.g., a call service or a message service). According to an embodiment, the application 2370 may include an application (e.g., device health care application of mobile medical equipment) designated according to an attribute of the external touch sensing device. According to an embodiment, the application 2370 may include an application received from the external touch sensing device. The at least a part of the programming module 2310 may be implemented (e.g., executed) by software, firmware, hardware (e.g., the processor 2310), or a combination of two or more of them, and may include, for example, modules, programs, routines, sets of instructions, or processes for performing one or more functions.

A term "module" used herein may mean, for example, a unit including one of or a combination of two or more of hardware, software, and firmware, and may

The invention claimed is:

1. A touch sensing device comprising:
   a plurality of first axis electrodes arranged in a first direction;
   a plurality of second axis electrodes arranged in a second direction that intersects the plurality of first axis electrodes; and
   a controller,
   wherein the controller is configured to:
   upon receiving a first electrode signal having a first frequency generated from a first electrode of a pen through the plurality of first axis electrodes and the plurality of second axis electrodes, determine a contact position of the pen by using the first electrode signal,
   upon receiving a second electrode signal having a second frequency generated from a second electrode of the pen through the plurality of first axis electrodes and the plurality of second axis electrodes, determine additional information related to the pen by using the second electrode signal, wherein the second frequency is different from the first frequency, and
   determine at least one of tilt information of the pen or rotation information of the pen by using a profile of the first electrode signal and a profile of the second electrode signal,
   wherein an electrode signal is not generated from the second electrode of the pen while the first electrode signal is generated from the first electrode of the pen, based on a contact pressure between a tip of the pen and the touch sensing device being less than a threshold value, and
   wherein the second electrode signal is generated from the second electrode of the pen while the first electrode signal is generated from the first electrode of the pen, based on the contact pressure being greater than or equal to the threshold value.

2. The touch sensing device of claim 1, wherein the second electrode signal comprises at least one of information about the contact pressure between the touch sensing device and the tip of the pen, information about a state of a button included in the pen, and identification information of the pen.

3. The touch sensing device of claim 2, wherein the second frequency of the second electrode signal is changeable depending on the at least one of the information about the contact pressure between the touch sensing device and the tip of the pen, the information about the state of the button included in the pen, and the identification information of the pen.

4. The touch sensing device of claim 1, wherein the controller is further configured to determine a tilt degree of the pen based on a distance between a central point of the profile of the first electrode signal and a central point of the profile of the second electrode signal.

5. The touch sensing device of claim 1, wherein the controller is further configured to determine a tilt direction of the pen based on a relative position between the profile of the first electrode signal and the profile of the second electrode signal.

6. The touch sensing device of claim 1, wherein the second electrode of the pen comprises a plurality of sub-electrodes of which each generates each of a plurality of sub-electrode signals, and the controller is further configured to determine the rotation information of the pen based on at least one of a position of a profile of each of the plurality of sub-electrode signals and a relative position between profiles of the plurality of sub-electrode signals.

7. A pen comprising:
   a first electrode;
   a second electrode arranged physically apart from the first electrode; and
   a controller,
   wherein the controller is configured to:
   control the first electrode to generate a first electrode signal having a first frequency while controlling the second electrode not to generate an electrode signal, based on a contact pressure between a tip of the pen and a touch sensing device being less than a threshold value, and control the second electrode to generate a second electrode signal having a second frequency that is different from the first frequency while controlling the first electrode to generate the first electrode signal, based on the contact pressure being greater than or equal to the threshold value.

8. The pen of claim 7, wherein at least one of the first frequency and the second frequency is changeable depending on the contact pressure.

9. The pen of claim 8, wherein the second electrode signal comprises information indicating whether the contact pressure is greater than or equal to or is less than the threshold value.

10. The pen of claim 7, wherein the second electrode signal comprises at least one of information about the contact pressure, information about a state of a button included in the pen, or identification information of the pen.

11. The pen of claim 10, wherein the second frequency is changeable depending on information included in the second electrode signal.

12. The pen of claim 7, wherein at least one of a profile of the first electrode signal and a profile of the second electrode signal is used for the touch sensing device to determine at least one of tilt information of the pen or rotation information of the pen.

* * * * *